US012624428B2

(12) United States Patent
Wang et al.

(10) Patent No.: US 12,624,428 B2
(45) Date of Patent: *May 12, 2026

(54) IRON NITRIDE COMPOSITIONS

(71) Applicant: REGENTS OF THE UNIVERSITY OF MINNESOTA, Minneapolis, MN (US)

(72) Inventors: Jian-Ping Wang, Shoreview, MN (US); YanFeng Jiang, Minneapolis, MN (US); Md Mehedi, Minneapolis, MN (US); Yiming Wu, Shoreview, MN (US); Bin Ma, Roseview, MN (US); Jinming Liu, Minneapolis, MN (US); Delin Zhang, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,394

(22) Filed: Nov. 10, 2023

(65) Prior Publication Data

US 2024/0076764 A1 Mar. 7, 2024

Related U.S. Application Data

(63) Continuation of application No. 16/610,285, filed as application No. PCT/US2018/031113 on May 4, 2018, now Pat. No. 11,859,271.

(Continued)

(51) Int. Cl.

*C22C 38/00* (2006.01)
*C22C 33/00* (2006.01)

(Continued)

(52) U.S. Cl.

CPC .......... *C22C 38/001* (2013.01); *C22C 33/006* (2013.01); *H01F 1/11* (2013.01);

(Continued)

(58) Field of Classification Search

CPC .................................................... C22C 38/001

See application file for complete search history.

(56) References Cited

U.S. PATENT DOCUMENTS 9,715,957 B2 7/2017 Wang et al.
11,161,175 B2 11/2021 Wang et al.

(Continued)

FOREIGN PATENT DOCUMENTS

WO 2016-122987 A1 8/2016

OTHER PUBLICATIONS

Microstructural study and numerical simulation of phase decomposition of heat treated Co—Cu alloys; A.M. Mebed, Alaa M. Abd-Elnaiem; Dec. 6, 2016; ScienceDirect.

(Continued)

*Primary Examiner* — Christopher S Kessler
(74) *Attorney, Agent, or Firm* — BakerHostetler

(57) ABSTRACT

All example composition may include a plurality of grains including an iron nitride phase. The plurality of grains may have an average wain size between about 10 nm and about 200 nm. An example technique may include treating a composition including a plurality of grains including au iron-based phase to adjust an average grain size of the plurality of grains to between about 20 nm and about 100 ma. The example technique may include nitriding the plurality of grains to form or grow an iron nitride phase.

5 Claims, 18 Drawing Sheets

Related U.S. Application Data

(60) Provisional application No. 62/501,462, filed on May 4, 2017.

(51) Int. Cl.
*H01F 1/11* (2006.01)
*H01F 7/02* (2006.01)
*H01F 41/02* (2006.01)

(52) U.S. Cl.
CPC ......... *H01F 7/021* (2013.01); *H01F 41/0253* (2013.01); *C22C 2200/04* (2013.01); *C22C 2202/02* (2013.01)

(56) References Cited

U.S. PATENT DOCUMENTS

| | | | |
|---|---|---|---|
| 11,302,472 | B2 | 4/2022 | Wang et al. |
| 2008/0318087 | A1 | 12/2008 | Hattori et al. |
| 2014/0290434 | A1 | 10/2014 | Matthiesen |
| 2014/0299810 | A1 | 10/2014 | Wang et al. |
| 2015/0380135 | A1 | 12/2015 | Wang et al. |

OTHER PUBLICATIONS

Yamamoto et al., Formation of Fe16N2 in Deformed Iron by Ion Implantation Method Proceedings of 1998 International Conference on Ion Implantation Technology (Year: 1998).

Baurin et al., Decision on Appeal, USPTO Trial and Appeal Board, Nov. 6, 2024, 11 pages, United States.

IRON NITRIDE COMPOSITIONS

CROSS-REFERENCE TO RELATED APPLICATION

This application is a continuation of U.S. patent application Ser. No. 16/610,285, filed May 4, 2018, which claims priority to National Stage Application of International Patent App. No. PCT/US2018/031113, filed May 4, 2018, which claims the benefit of U.S. Provisional Patent Application No. 62/501,462, filed May 4, 2017, the entire disclosures of which are hereby incorporated by reference as if set forth in their entirety herein.

GOVERNMENT RIGHTS

This invention was made with government support under DE-AR0000199 awarded by the U.S. Department of Energy. The government has certain rights in the invention.

TECHNICAL FIELD

The disclosure relates to iron nitride compositions and iron nitride-based magnets, and techniques for forming iron nitride compositions and iron nitride-based magnets.

BACKGROUND

Permanent magnets play a role in many electromechanical systems, including, for example, alternative energy systems. For example, permanent magnets are used in sensors, actuators, electric motors or generators, which may be used in vehicles, wind turbines, and other alternative energy mechanisms. Many permanent magnets in current use include rare earth elements, such as neodymium, which result in high energy product. These rare earth elements are in relatively short supply, and may face increased prices and/or supply shortages in the future. Additionally, some permanent magnets that include rare earth elements are expensive to produce. For example, fabrication of NdFeB and ferrite magnets generally includes crushing material, compressing the material, and sintering at temperatures over 1000° C., all of which contribute to high manufacturing costs of the magnets. Additionally, the mining of rare earth can lead to severe environmental deterioration.

Iron nitride magnets based on the $Fe_{16}N_2/Fe_8N$ phase are of interest as a magnetic material for applications ranging from data storage to electrical motors for vehicles, wind turbines, and other power generation equipment. The base elements (Fe, N) are inexpensive and widely available, in contrast to rare earth elements in rare earth element-based magnets, which are costly and subject to supply availability risks. The $Fe_{16}N_2$phase, which is the ordered version of $Fe_8N$, has a large magnetic anisotropy constant and saturation magnetization but is difficult to manufacture.

SUMMARY

The disclosure describes example alloy compositions. In some examples, an example alloy composition may include a plurality of grains including an iron nitride phase. The plurality of grains has an average size between about 20 nm and about 100 nm.

The disclosure describes example techniques for forming an alloy composition including a plurality of grains including an iron nitride phase. The plurality of grains has an average size between about 2 nm and about 100 nm. In some examples, an example technique may include treating an alloy composition including a plurality of grains including an iron-based phase to control an average grain size of the plurality of grains to between about 20 nm and about 100 nm. The example technique may include nitriding the plurality of grains to form or grow an iron nitride phase.

The details of one or more examples are set forth in the accompanying drawings and the description below. Other features, objects, and advantages will be apparent from the description and drawings, and from the claims.

DETAILED DESCRIPTION

Figure 1:
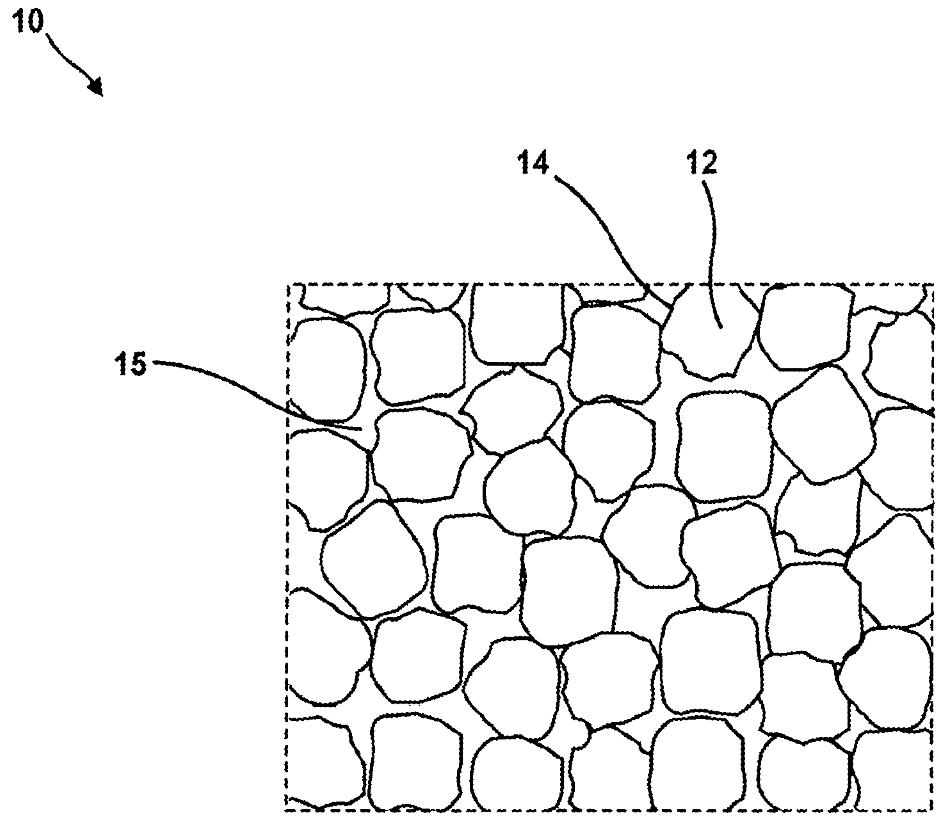
FIG. 1 is a conceptual and schematic diagram illustrating an example alloy composition including a plurality of grains including an iron nitride phase.

The disclosure describes an example alloy composition including a plurality of grains. The term "grains" refers to discrete microstructural domains defined by boundaries, for example, grains defined by grain boundaries. The term "grains" also refers to particles or crystallites that include a predetermined phase. In some examples, the plurality of grains includes an iron nitride phase. The plurality of grains has an average grain size between about 10 nm and about 200 nm. The disclosure also describes example techniques for preparing the example alloy compositions. The average grain size between about 10 nm and about 200 nm may result in relatively high coercivity, for example, greater than about 600 Oe, greater than 1000 Oe, greater than 2000 Oe, or even greater than 6000 Oe. Example alloy compositions including iron nitride according to the disclosure may be used to prepare bulk magnetic materials, such as bulk permanent magnets. For example, alloy compositions described herein may be used in, for example, bonded magnets, pressed magnets, other bulk magnets that include or do not include binder material, or the like.

Without wishing to be bound by theory, saturation magnetization is an intrinsic property, related to the crystal structure, for example, relative atomic positions, within a material. Coercivity is an extrinsic property of a magnetic material, and is related to the microstructure, for example, the grain structure, phases, grain size, grain boundaries, material shape, and the like. In some examples, magnetocrystalline anisotropy may result from the crystalline structure of phase domains within crystals. For example, magnetocrystalline anisotropy may be related to the distortion of a body-centered-cubic iron crystalline lattice into a body-centered-tetragonal iron-nitride crystalline lattice in an iron nitride crystal. Iron nitride including an $\alpha''$-$Fe_{16}N_2$ phase may have a relatively high saturation magnetization and a relatively high energy product, for example, as high as 135 MGOe. Shape anisotropy may be related to the shape of the nanoparticles. For example, a nanoparticle may define a longest dimension and a shortest dimension, and the differences in these dimensions may ultimately contribute to magnetic anisotropy. Magnetic or shape anisotropies may be used to enhance magnetic properties, such as coercivity, of nanoparticles according to the disclosure.

Therefore, the microstructure may influence coercivity of a material. For example, maintaining an average grain size between about 20 nm and about 100 nm may increase coercivity, for example, to greater than about 1000 Oe. The disclosure describes example techniques for preparing alloy compositions including a plurality of grains that include $\alpha''$-$Fe_{16}N_2$ iron nitride having a predetermined grain structure, for example, a predetermined average particle size and particle size distribution. In some examples, example techniques for forming grains having a predetermined average grain size may include at least one of quenching, annealing, doping, compaction, bombardment, or ion implantation.

Example techniques and alloy compositions according to the disclosure may be used to prepare bulk permanent magnets having relatively enhanced magnetic properties such as relatively high coercivity. For example, permanent magnets prepared from example materials according to the disclosure may exhibit magnetic properties comparable to or better than those of rare earth magnets, without including any rare earth elements.

FIG. 1 is a conceptual and schematic diagram illustrating an example alloy composition. Example alloy composition 10 includes a plurality of grains 12 defined by respective grain boundaries 14. The plurality of grains 12 includes an iron nitride phase. The iron nitride phase may include any iron nitride. In some examples, the iron nitride phase includes at least one of FeN, $Fe_2N$, $Fe_3N$, $Fe_4N$, $Fe_2N_6$, $Fe_7N_3$, $Fe_8N$, $Fe_{16}N_2$, $FeN_x$, wherein x is between about 0.05 and about 0.5, or $Fe_xN_{1-x}$, where x is a number greater than 0 and less than 1. In some examples, grains 12 may also include elemental iron. In some examples, the elemental iron may include an α-Fe phase. In some examples, the combination of elemental iron and iron nitride may act as an exchange-spring structure, for example, imparting permanent magnetization capability to alloy composition 10. In some examples, alloy composition 10 may include a melt spun material including plurality of grains 12. For example, the grain structure of a melt spun material may be different from that of a thin film, ion implanted material.

In some examples, the plurality of grains 12 includes a $Fe_{36}N_2$phase. For example, the plurality of grains 12 may include an $\alpha''$-$Fe_{16}N_2$ phase. Throughout this disclosure, the terms $Fe_{16}N_2$, $\alpha''$-$Fe_{16}N_2$, $\alpha''$-$Fe_{16}N_2$ phase, and $\alpha''$-$Fe_{16}N_2$ phase domain, for example, may be used interchangeably to refer to an $\alpha''$-$Fe_{16}N_2$ phase domain within a material. In some examples, alloy composition 10 may include greater than about 40% by volume of the $\alpha''$-$Fe_{16}N_2$ phase. For example, alloy composition 10 may include greater than about 50% by volume of the $\alpha''$-$Fe_{16}N_2$ phase. The $\alpha''$-$Fe_{16}N_2$ phase may exhibit an intrinsic magnetocrystalline anisotropy, as discussed with reference to FIGS. 2A and 2B.

Figure 2A:
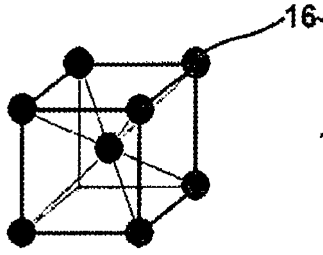
FIG. 2A is a conceptual and schematic diagram illustrating a crystallographic unit cell of α-Fe.
Figure 2B:
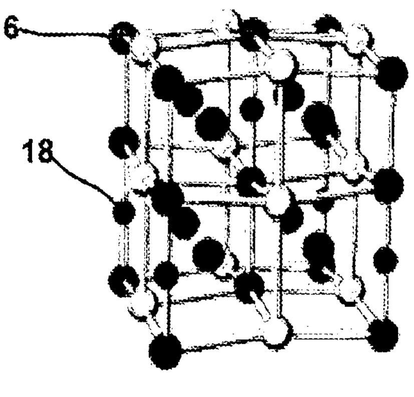
FIG. 2B is a conceptual and schematic diagram illustrating a crystallographic unit cell of $\alpha''$-$Fe_{16}N_2$.

FIG. 2A is a conceptual and schematic diagram illustrating a unit crystallographic cell of α-Fe. FIG. 2A shows a unit cell including iron atoms 16 in an isotropic arrangement. FIG. 2B is a conceptual and schematic diagram illustrating a unit crystallographic cell of $\alpha''$-$Fe_{16}N_2$. FIG. 2B shows eight (8) iron unit cells in a strained state with nitrogen atoms 18 in interstitial spaces between iron atoms 16 to form the $Fe_{16}N_2$ iron nitride unit cell. As shown in FIG. 2B, in the $\alpha''$-$Fe_{16}N_2$ phase, nitrogen atoms 18 are aligned along the (002) (iron) crystal planes. The iron nitride unit cell is distorted such that the length of the unit cell along the <001> axis is approximately 6.28 angstroms (Å) while the length of the unit cell along the <010> and <100> axes is approximately 5.72 Å. The $\alpha''$-$Fe_{16}N_2$ unit cell may be referred to as a body-centered tetragonal unit cell when in the strained state. When the $\alpha''$-$Fe_{16}N_2$ unit cell is in the strained state, the <001> axis may be referred to as the c-axis of the unit cell. The c-axis may be the magnetic easy axis of the $\alpha''$-$Fe_{16}N_2$ unit cell. In other words, $\alpha''$-$Fe_{16}N_2$ crystals exhibit magnetic anisotropy. In some examples, core-shell nanoparticles 10*a* or 10*b* may have at least one $Fe_{16}N_2$ iron nitride crystal. In some examples, such an anisotropic particle may include a plurality of iron nitride crystals, at least some (or all) of which are $Fe_{16}N_2$ crystals.

The α"-$Fe_{16}N_2$ phase has high saturation magnetization and magnetic anisotropy constant. The high saturation magnetization and magnetic anisotropy constants result in a magnetic energy product that may be higher than rare earth magnets. For example, experimental evidence gathered from thin film α"-$Fe_{16}N_2$ permanent magnets suggests that bulk $Fe_{16}N_2$ permanent magnets may have desirable magnetic properties, including an energy product of as high as about 130 MegaGauss*Oerstads (MGOe), which is about two times the energy product of NdFeB (which has an energy product of about 60 MGOe). Additionally, iron and nitrogen are abundant elements, and thus are relatively inexpensive and easy to procure.

Respective grains 12 of the plurality of grains have respective grain boundaries 14. In some examples, the grain boundaries may include non-magnetic material. Grain boundaries 14 define the respective shapes and respective dimensions of respective grains 12. For example, grain boundaries 14 may define substantially spherical, ellipsoidal, cuboidal, polygonal, or any other closed shapes of grains 12. While the plurality of grains 12 is illustrated as including irregular grains in FIG. 1, in other examples, the plurality of grains 12 may include grains having any suitable shape. For example, the plurality of grains 12 may include grains having a spheroidal, ellipsoidal, cuboidal, polygonal cross-sectional, or any other suitable shape. In some examples, grains 12 may be separated by bulk 15. In some examples, bulk 15 may include nonmagnetic material. In some examples, grain boundaries 14 may be substantially thin, for example, relative to the average grain size, such that no bulk 15 is present between respective grains of plurality of grains 12. In some examples, grain boundaries 14 may be substantially thick, for example, relative to the average grain size, such that hulk 15 is defined by grain boundaries 14 between respective grains 12.

In general, a size of a grain can be measured with the diameter of a spherical grain or the cube root of the calculated volume of a non-spherical grain. In some examples, the shape of grains 12 may define respective major dimensions of grains 12. For substantially spherical grains, the major dimension may be defined by a diameter. For substantially ellipsoidal grains, the major dimension may be defined by a major elliptical axis. For grains having an arbitrary grain boundary, the major dimension may be defined by the maximum separation between opposing portions of grain boundaries 14 across respective grains 12. For a grain that is symmetric or exhibits symmetry about an axis, a grain size of the grain may refer to the major dimension of the grain. For a grain that is irregular or asymmetric, a grain size of a grain refers to the average of all diameters of the grain, each diameter being a line passing through the geometric center of the grain.

An average grain size is in general measured in accordance with ASTM (American Standard Test Method) E112-13, which describes standard test methods for determining average grain size. In some examples, the plurality of grains 12 may have a predetermined average grain size, or a statistical average of the respective grain sizes of each grain of the plurality of grains 12. If the number of grains in the entire plurality of grains 12 is very large, it may not be practical or possible to determine the size of each grain in the plurality of grains 12, and instead, an appropriate sample of the entire plurality of grains may be selected to calculate the average grain size. Because respective grains of the plurality of grains 12 may have different grain sizes, a calculated grain size for the plurality of grains 12 may depend on the number of grains in the sample. For relatively small sample sizes, for example, n<10, a calculated average grain size for a respective sample may substantially vary when different samples are selected from the plurality of grains 12. As the sample size increases, the calculated average grain size for the sample may tend to or approach the average grain size for the entire plurality of grains 12. In some examples, a sample size may be sufficiently large such that the average grain size for that sample is about the same as the average grain size for the entire plurality of grains 12. In some examples, the sample of the plurality of grains 12 may include each grain of the plurality of grains 12. In some examples the sample of the plurality of grains 12 may include a selection of a statistically significant number of grains selected from the plurality of grains 12, for example, a number of grains sufficiently large so that the average major dimension of the sample is about the same as the average major dimension of the plurality of grains 12.

The selection of the sample may be performed using suitable selection techniques or schemes, and suitable statistical techniques may be used to determine the average grain size of the plurality of grains 12 based on the average grain size of the sample. For example, each grain i of the plurality of grains 12 may have a respective grain size $d_i$, and the average grain size d may be calculated as $$d = \left(\sum_{i=1}^{n} d_i\right)/n,$$

where n is the number of grains in a sample of the plurality of grains 12. In some examples, the plurality of grains 12 may have an average grain size between about 10 nm and about 200 nm. For example, the average grain size may be between about 20 nm and about 100 nm, or between about 20 nm and about 40 nm. In some examples, alloy composition 10 may include a melt spun material including the plurality of grains 12 having an average grain size between about 10 nm and about 200 nm, or between about 20 nm and about 100 nm, or between about 20 nm and about 40 nm. In some examples, the plurality of grains 12 may have an average grain size that is the same or similar as an average magnetic domain size. For example, alloy composition 10 may include a plurality of magnetic domains (not shown), and the average magnetic domain may be within ±50% of the average grain size, or within ±20% of the average grain size, or within ±10% of the average grain size, or within ±1% of the average grain size.

The grain sizes for respective grains in the plurality of grains 12 may be associated with a grain size distribution, or a relationship between grain size bands and the number of grains distributed within different grain size bands. If grain sizes are relatively uniform, a majority of the grains will be distributed within a few grain size hands. If grain sizes are relatively non-uniform, the grains will be distributed within a relatively larger number of grain size bands. In some examples, the variation in the grain size distribution of the grain sizes of a sample of the plurality of grains 12 may be determined by determining a relative standard deviation of the grain size distribution of the sample. A relative standard deviation of a sample of grain sizes is a ratio of the standard deviation of grain sizes of the sample to the average grain size of the sample. The standard deviation may be determined by any appropriate statistical technique. In examples in which the grain sizes in a sample are relatively uniform, the sample may tend to have a relatively low relative standard deviation. In examples in which grain sizes in a sample are relatively non-uniform, the sample may tend to have a relatively high relative standard deviation. In some examples, the plurality of grains 12 may include grains having substantially uniform grain sizes. For example, the relative standard deviation of the grain size distribution of the plurality of grains may be less than 50%. In some examples, the relative standard deviation of the grain size distribution of the plurality of grains may be less than 5%.

The grain size and grain size distribution of the plurality of grains 12 may affect the magnetocrystalline anisotropy and the shape anisotropy, as discussed elsewhere in the disclosure. Without wishing to be bound by theory, reducing the average grain size may increase the coercivity of alloy composition 10. For example, as the average grain size is reduced from about 200 nm, for example, to about 30 nm, or about 23 nm, the coercivity may increase, for example, from about 600 Oe to about 6000 Oe or higher. However, if the average grain size is further reduced, for example, below a ferromagnetic exchange length, (for example, about 23 nm for $Fe_{16}N_2$) the coercivity of alloy composition 10 may begin to reduce. Therefore, the average grain size of the plurality of grains 12 may be engineered to be within a predetermined range, for example, between about 20 nm and about 200 nm. Using these or similar average grain size ranges may improve the magnetization of alloy composition 10, for example, by providing a relatively high coercivity.

For example, alloy composition 10 may have a coercivity of at least about 600 Oe. In some examples, the average grain size may be less than about 90 nm providing alloy composition 10 with a coercivity of at least about 600 Oe. For example, alloy composition 10 having a coercivity of at least about 600 Oe may have an average grain size less than about 80 nm. In some examples, alloy composition 10 may have a coercivity of at least about 1000 Oe. In some examples, alloy composition 10 may have a coercivity of at least about 2000 Oe. In some examples, the average grain size may be less than about 50 nm providing alloy composition 10 with a coercivity of at least about 2000 Oe. In some examples, alloy composition 10 may have a coercivity of at least about 6000 Oe.

In addition to the composition and geometry of the grains, the composition and geometry of the grain boundaries may also influence the magnetic properties of alloy composition 10. Thus, the magnetic properties of alloy composition 10 may be controlled by controlling the grain boundaries. For example, controlling the grain boundaries may include adjusting the grain boundaries to adjust magnetic properties of alloy composition 10. In some examples, an average grain boundary size of the plurality of grains may be between about 2 nm and about 5 nm. In some examples, grain boundaries of the plurality of grains include at least one of an antiferromagnetic phase, $Fe_2O_3$, FeO, FeMn, MnN, $Fe_2N$, $Fe_3N$ or their mixed phase(s). In some examples, alloy composition 10 may include a nonmagnetic element or compound configured to form domain wall pinning sites at the grain boundaries. For example, the nonmagnetic element or compound may include an element or compound selected from the group consisting of Al, Cu, Ti, Mn, Zr, Ta, B, C, Ni, Ru, $SiO_2$, $Al_2O_3$, or combinations thereof.

Example techniques described elsewhere in the disclosure, for example, one or more of annealing, quenching, compaction, bombardment, ion implantation, may be used to engineer the average grain size or the grain size distribution of the plurality of grains 12. In addition to those techniques, alloy composition 10 may also be doped with predetermined dopants, for example, dopants that may assist in controlling the average grain size or the grain size distribution. Without wishing to be bound by theory, ions of dopants within different sites of the microstructure of alloy composition 10 may limit or modify phase or crystal growth to eventually limit and control the average grain size and the grain size distribution. For example, dopants may migrate to or otherwise occupy grain boundaries 14, and limit the expansion of grain boundaries 14. Dopants may also promote a relatively narrow grain size distribution (increased uniformity of grain sizes) by preventing susceptible phases or crystals from substantially departing from the average grain size.

Additionally, in some examples, the plurality of grains 12 may include other materials, such as elemental iron, cobalt, nickel, dopants, or the like. In some examples, the cobalt, nickel, dopants, or the like may be at least partially removed after the milling process using one or more suitable techniques. Dopants may include, for example, at least one of aluminum (Al), manganese (Mn), lanthanum (La), chromium (Cr), cobalt (Co), titanium (Ti), nickel (Ni), zinc (Zn), a rare earth metal, boron (B), carbon (C), phosphorous (P), silicon (Si), or oxygen (O).

Compositions, for example, mixtures, including example alloy composition 10 may be compacted and shaped or otherwise further processed to form hulk magnetic materials, such as permanent magnets. In some examples, a majority of the plurality of grains have respective easy axes of magnetizing aligned in substantially the same direction, for example, in the bulk magnetic materials. In some examples, example alloy composition 10 may be prepared by compacting nanoparticles including iron nitride. In other examples, alloy composition 10 may be prepared by any suitable techniques for engineering the compositions or phase constitutions of grains and grain boundaries, or the microstructure of alloy composition 10, including for example, casting, annealing, and nitriding. In some examples, alloy composition 10 may be further processed, for example, by one or more of molding, compacting, pressurizing, or annealing, to prepare bulk magnetic materials, such as permanent magnets. Thus, example alloy compositions according to the disclosure may be used to prepare bulk magnetic materials, such as permanent magnets.

Figure 3:
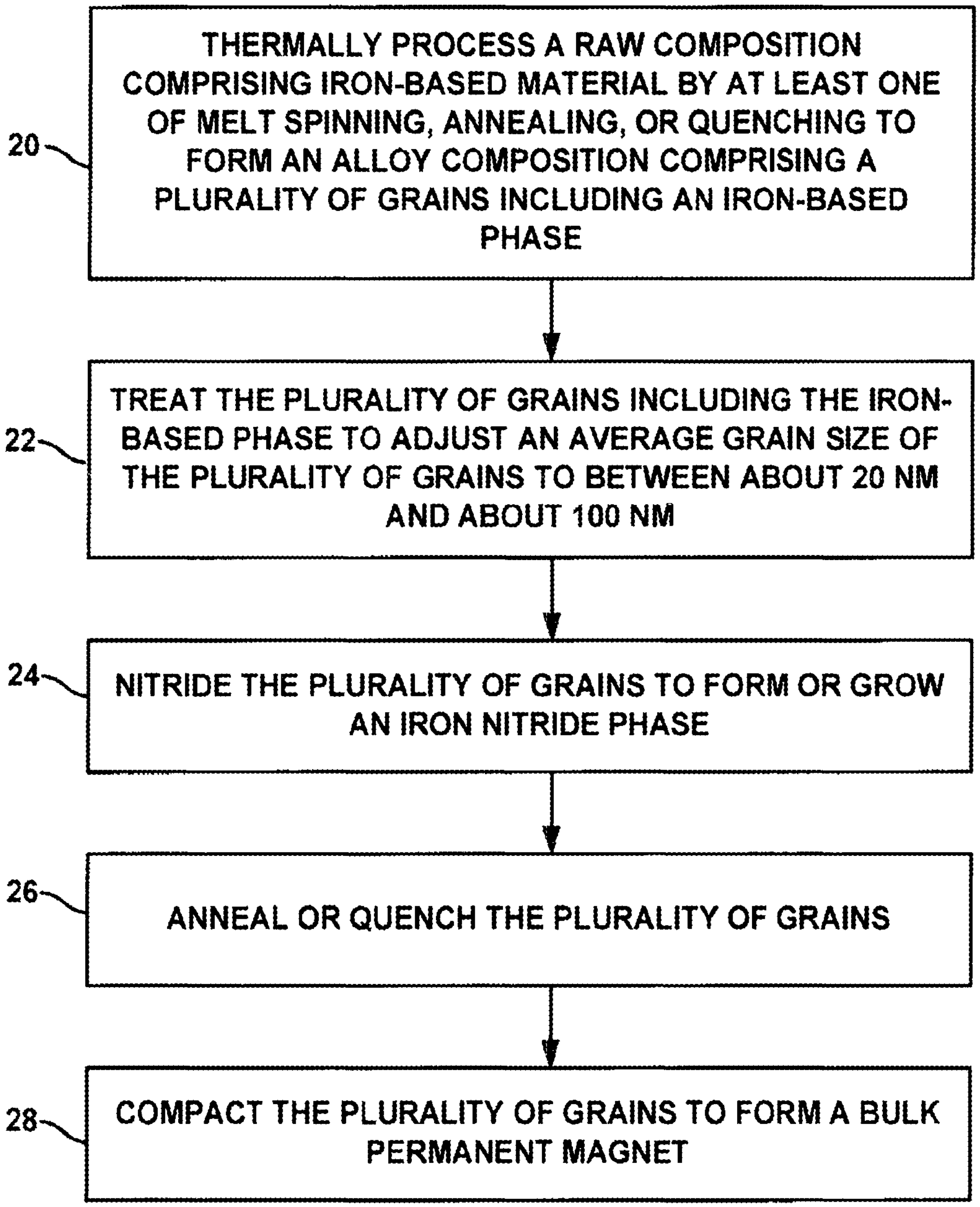
FIG. 3 is a flow diagram illustrating an example technique for forming an alloy composition including a plurality of grains including an iron nitride phase.

Example techniques described with reference to FIG. 3 may be used to prepare example alloy compositions and bulk permanent magnets according to the disclosure. FIG. 3 is a flow diagram illustrating an example technique for forming alloy composition 10. In some examples, the example technique of FIG. 3 may optionally include forming alloy composition 10 including the plurality of grains 12 including an iron-based phase (20). For example, the example technique of FIG. 3 may include thermally processing a raw composition including iron-based material by at least one of melt spinning, annealing, or quenching to form alloy composition 10 including the plurality of grains 12. Thus, alloy composition 10 may include a melt spun material including plurality of grains 12 after the forming (20). The melt spinning may be performed by flowing a molten iron-based material over a cold roller surface to quench the molten material and form a brittle ribbon of material. In some examples, the iron-based material may include nitrogen. In some examples, the cold roller surface may be cooled at a temperature below room temperature by a cooling agent, such as water. For example, the cold roller surface may be cooled at a temperature between about 10° C. and about 25° C. The annealing may be performed by heat treating the iron-based material at a predetermined heating or cooling rate. For example, the brittle ribbon of material may be annealed at a temperature between about 200° C. and about 600° C. at atmospheric pressure for between about 0.1 hour and about 10 hours. In some examples, the melt spinning, annealing, or quenching may be performed in a nitrogen or argon atmosphere. The quenching may include rapidly cooling the material using a suitable quenching agent, for example, water or other quenching agents describes elsewhere in the disclosure. The brittle ribbon of material may be shattered to form an iron-based material or powder, for example, alloy composition 10 including the plurality of grains. In some examples, step 20 may not be performed, and the technique may begin with step 22, by obtaining pre-prepared alloy composition 10 including the plurality of grains 12 including the iron-based phase.

The iron-based phase in alloy composition 10 after step 20, or otherwise, before step 22 is initiated may include one or more phases including one or more of elemental iron or alloys of iron, for example, iron nitride phases. The example technique of FIG. 3 includes treating the plurality of grains 12 including the iron-based phase to control the average grain size of the plurality of grains (22). For example, controlling the average grain size may include adjusting the average grain size to between about 20 nm and about 100 nm. In some examples, the treating the plurality of grains 12 to adjust the average grain size may include at least one of quenching, annealing, compacting, bombarding, or ion implanting the plurality of grains 12.

Without wishing to be bound by theory, annealing may promote grain growth, and modify grain boundaries. Quenching may promote the formation of grains on rapid cooling of heated or molten material. Therefore, annealing followed by quenching may be used to adjust the average grain size of the plurality of grains, for example, by using annealing temperatures and periods sufficient to allow grain growth to predetermined sizes, followed by quenching to arrest grain growth. In some examples, controlling the average grain size may include annealing, for example, at a temperature between about 300° C. and about 700° C., for a period of time between about 1 minute to about 0.5 hours, followed by quenching, for example, at room temperature in cold water.

In some examples, the treating 22 may include doping alloy composition 10 or the plurality of grains 12 with predetermined dopants to control the average grain size of the plurality of grains 12. Without wishing to be bound by theory, dopants species may diffuse, migrate, or otherwise distribute to grain boundaries, and may limit or restrict grain growth. Therefore, dopants may be used to limit grain sizes within predetermined size ranges. Dopants may also promote uniformity of grain sizes, by preventing nonuniform grain growth, for example, by substantially only allowing grain growth between locations or periphery defined by dopant sites. In some examples, the treating 22 may include adding a dopant to the raw composition used for forming alloy composition 10 including the plurality of grains 12 (20). In some examples, dopant may be added after the plurality of grains 12 is formed, for example, by adding a predetermined amount of dopant to alloy composition 10, followed by a suitable treatment that may alloy dopant to migrate or diffuse to grain boundaries. For example, heating or annealing may be used to promote the relatively uniform diffusion of dopant added to alloy composition 10 throughout the plurality of grains 12. In some examples, the dopant may be selected from the group consisting of Cu, B, Mn, Ag, Zr, Ti, Si, Nb, Co, and rare earth elements (for example, La, Ce, or other rare earth elements), or combinations thereof. Dopants may be selected such that they do not affect the magnetic performance of alloy composition 10 or bulk magnets prepared using alloy composition 10. Dopants, or materials that may otherwise block or restrict grain growth, may also be introduced by subjecting alloy composition 10 to bombardment or ion implantation. For example, alloy composition may be bombarded with suitable species, including atoms molecules, nanoparticles, or clusters. In some examples, ionic species may be implanted, for example, by delivering energizing species towards alloy composition 10 that may get implanted into the plurality of grains 12. In some examples, the bombardment or ion implantation may be indirect, for example, by coating alloy composition 10 with a first species to be implanted, and directing a second energized species towards coated alloy composition to cause at least some of the first species to be knocked into or otherwise diffuse or migrate from a surface into a bulk of alloy composition 10.

In some examples, the treating 22 may include compaction. Without wishing to be bound by theory, compaction, for example mechanical or physical compaction that impart shocks, impulses, or otherwise transfer energy, may induce recrystallization of grains to increase grain sizes.

While techniques such as annealing, quenching, doping, compaction, bombardment, and ion implantation have been described separately, in some examples, one or more of these techniques or other suitable techniques may be combined, or used in series or parallel stages, to control the grain size (22).

In some examples, the treating 22 may include techniques that may result in exposure of the plurality of grains 12 to elevated temperatures, for example, temperatures higher than decomposition temperatures associated with certain iron nitride phases. Without wishing to be bound by theory, iron nitride phases may be unstable at elevated temperatures, and may decompose if subjected to temperatures beyond respective decomposition temperatures. For example, $\alpha''$-$Fe_{16}N_2$ is unstable above thermal decomposition temperatures of about 214° C. Therefore, $\alpha''$-$Fe_{16}N_2$ phases introduced before controlling the grain size (22) may decompose, and substantially reduced or no $\alpha''$-$Fe_{16}N_2$ phases may survive controlling the grain size (22). In some examples, iron nitride phases, for example, $\alpha''$-$Fe_{16}N_2$ phases, that may be unstable at temperatures associated with the thermal treatment for controlling the grain size (22) may be introduced or reintroduced after controlling the grain size (22). In other words, controlling the grain size 22 may be performed before iron nitride phases such as $\alpha''$-$Fe_{16}N_2$ are formed or introduced in the plurality of grains 12. However, in some examples, the plurality of grains 12 may include iron nitride phases before the controlling the grain size, which may decompose, damage, or exhibit domain shrinkage as a result of controlling the grain size (22), and may be followed by introduction, reintroduction, growth, or regrowth of iron nitride phases.

For example, the example technique of FIG. 3 may include nitriding the plurality of grains 12 to form or grow an iron nitride phase (24). For example, the nitriding may form new iron nitride nucleation sites or new iron nitride phases, or may cause the domain enlargement or growth in the size of existing iron nitride phases. In some examples, the plurality of grains 12 may include none or substantially none iron nitride phases, or none or substantially none $\alpha''$-$Fe_{16}N_2$ phases, before the nitriding 24. The nitriding 24 may be used to introduce or form an iron nitride phase, for example an iron nitride phase that may be converted to $\alpha''$-$Fe_{16}N_2$ by subsequent processing, for example, by post-treatment quenching and annealing. In some examples, the plurality of grains 12 may include some or relatively small phase domains including iron nitride, and the nitriding 24 may increase the size of the domains including iron nitride.

In general, by the nitriding 24, nitrogen from a nitrogen source is combined with iron to form iron nitride. Such a nitrogen source may be the same as or similar to nitrogen sources described in elsewhere in this disclosure, such as at least one of ammonia, ammonium nitrate, an amide-containing material, or a hydrazine-containing material. In some examples, nitriding the plurality of grains 12 may include heating alloy composition 10 to a selected temperature for a time sufficient to allow diffusion of nitrogen to a predetermined concentration substantially throughout a volume including iron. In this manner the heating time and temperature are related, and may also be affected by the composition and/or geometry of the volume including iron. For example, the heating may include heating to a temperature between about 125° C. and about 600° C. for between about 2 hours and about 9 hours. In addition to heating alloy composition 10, nitriding the plurality of grains 12 may include exposing to an atomic nitrogen substance, which diffuses into the volume including iron. In some examples, the atomic nitrogen substance may be supplied as diatomic nitrogen ($N_2$), which is then separated (cracked) into individual nitrogen atoms. In other examples, the atomic nitrogen may be provided from another atomic nitrogen precursor, such as ammonia ($NH_3$). In other examples, the atomic nitrogen may be provided from urea ($CO(NH_2)_2$). The nitrogen may be supplied in a gas phase alone (e.g., substantially pure ammonia or diatomic nitrogen gas) or as a mixture with a carrier gas. In some examples, the carrier gas is argon (Ar).

In some examples, nitriding the plurality of grains 12 may include a urea diffusion process, in which urea is utilized as a nitrogen source (e.g., rather than diatomic nitrogen or ammonia). Urea (also referred to as carbamide) is an organic compound with the chemical formula $CO(NH_2)_2$. Urea may be heated, e.g., within a furnace enclosing alloy composition 10, to generate decomposed nitrogen atoms which may diffuse into the volume including iron. In some examples, the constitution of the resulting nitrided iron material may controlled to some extent by the temperature of the diffusion process as well as the ratio (e.g., the weight ratio) of the iron-containing workpiece to urea used for the process. Further details regarding these nitriding processes (including urea diffusion) may be found in International Patent Application No. PCT/US12/51382, filed Aug. 17, 2012, the entire content of which is incorporated herein by reference. In some examples, nitriding the plurality of grains 12 includes autoclaving alloy composition 10 at a predetermined pressure, at a predetermined temperature, for a predetermined period of time, in a nitrogen-rich environment. In some examples, the predetermined pressure may be greater than about 100 atmospheres, or at least about 100 atmospheres. Without wishing to be bound by theory, diffusion of nitrogen species increases with pressure. Increasing the pressure, increases nitrogen diffusion. Using a pressure of at least about 100 atmospheres may increase the diffusion rate by at least about 10 times. Increasing the diffusion rate may promote the nitriding result, for example, for increasing the rate of iron nitride formation. In some examples, the nitriding 24 may include at least one of plasma electrolytic nitriding, jar nitriding, ammonia nitriding, or chemical mechanical nitriding. Thus, the nitriding 24 may form or promote the formation of iron nitride phases, for example, phases that may include $\alpha''$-$Fe_{16}N_2$, or phases that may be transformed to $\alpha''$-$Fe_{16}N_2$ phases.

The example technique of FIG. 3 may include a post-treatment including annealing or quenching the plurality of grains 12 (26), for example, after the nitriding 24. In some examples, the annealing may include stress annealing or magnetic annealing. In some examples, post-treatment 26 may include a first thermal annealing, following by a second annealing including stress annealing or magnetic annealing. In some examples, the post-treatment annealing 26 may facilitate the transformation of the crystalline structure of at least some of phases in the plurality of grains 12 from body centered cubic (bcc) iron to body centered tetragonal (bct) iron nitride. The annealing process may continue for a predetermined time that is sufficient to allow diffusion of the nitrogen atoms to the appropriate interstitial spaces in the iron crystal lattice. Such diffusion may promote the formation of iron nitride phases, and may promote the conversion of disordered iron nitride phases, for example, $Fe_8N$, into ordered iron nitride phases, for example, $Fe_{16}N_2$. However, heating at temperatures greater than about 250° C. may reduce the formation of ordered iron nitride phases, or may degrade previously-formed ordered iron nitride phases such as $Fe_{16}N_2$. Thus, the post-treatment annealing may include include heating the particles to a temperature between about 100° C. and about 250° C. In some examples, the annealing process continues for between about 20 hours and about 200 hours, such as between about 40 hours and about 60 hours. In some examples, the annealing process may occur under an inert atmosphere, such as Ar, to reduce or substantially prevent oxidation of the iron. Further, in some implementations, the temperature is held substantially constant. The annealing may result in magnetic material including at least one $\alpha''$-$Fe_{16}N_2$ phase domain.

In some examples, the annealing may include exposing the plurality of grains 12 to an external magnetic field during the annealing process. Annealing iron nitride materials in the presence of an applied magnetic field may enhance the $Fe_{16}N_2$ phase domain formation in iron nitride materials. Increased volume fractions of $\alpha''$-$Fe_{16}N_2$ phase domains may improve the magnetic properties of core-shell nanoparticles including iron nitride. Improved magnetic properties may include, for example, coercivity, magnetization, and magnetic orientation.

In some examples, an applied magnetic field during post-treatment annealing 26 may be at least 0.2 Tesla (T). The temperature at which the magnetic field annealing is performed may at least partially depend upon further elemental additions to the iron nitride base composition and the approach used to initially synthesize the iron nitride base composition. In some examples, the magnetic field may be at least about 0.2 T, at least about 2 T, at least about 2.5 T, at least about 6 T, at least about 7 T, at least about 8 T, at least about 9 T, at least about 10 T, or higher. In some examples, the magnetic field is between about 5 T and about 10 T. In other examples, the magnetic field is between about 8 T and about 10 T. Further details regarding annealing the materials including iron and nitrogen may be found in U.S. Provisional Application No. 62/019,046, filed Jun. 30, 2014, the entire content of which is incorporated herein by reference.

Alloy compositions, and techniques described herein may be used to form bulk magnetic materials, such as bulk permanent magnets, for example, by compacting alloy composition 10 or the plurality of grains 12 (28). For example, the techniques described herein for forming material comprising core-shell nanoparticles including iron nitride may be used in processes to form iron nitride bulk permanent magnets described in International Patent Application Number PCT/US2012/051382, filed on Aug. 17, 2012, and titled "IRON NITRIDE PERMANENT MAGNET AND TECHNIQUE FOR FORMING IRON NITRIDE PERMANENT MAGNET;" and International Patent Application Number PCT/US2014/015104, filed on Feb. 6, 2014, and titled "IRON NITRIDE PERMANENT MAGNET AND TECHNIQUE FOR FORMING IRON NITRIDE PERMANENT MAGNET," and U.S. Provisional Patent Application No. 61/935,516, filed Feb. 4, 2014, and titled "IRON NITRIDE MATERIALS AND MAGNETS INCLUDING IRON NITRIDE MATERIALS," the entire contents of which are incorporated herein by reference.

Example techniques and alloy compositions according to the disclosure may be used to eventually prepare bulk permanent magnets having relatively enhanced magnetic properties such as relatively high coercivity. For example, permanent magnets prepared from example core-shell nanoparticles according to the disclosure may exhibit magnetic properties comparable to or better than those of rare-earth magnets, without including any rare-earth elements.

Thus, the example technique of FIG. 3 may be used to prepare example alloy compositions and bulk permanent magnets including iron-based materials or iron-nitride phases, for example, $\alpha''$-$Fe_{16}N_2$.

EXAMPLES

Example 1

Figure 4:
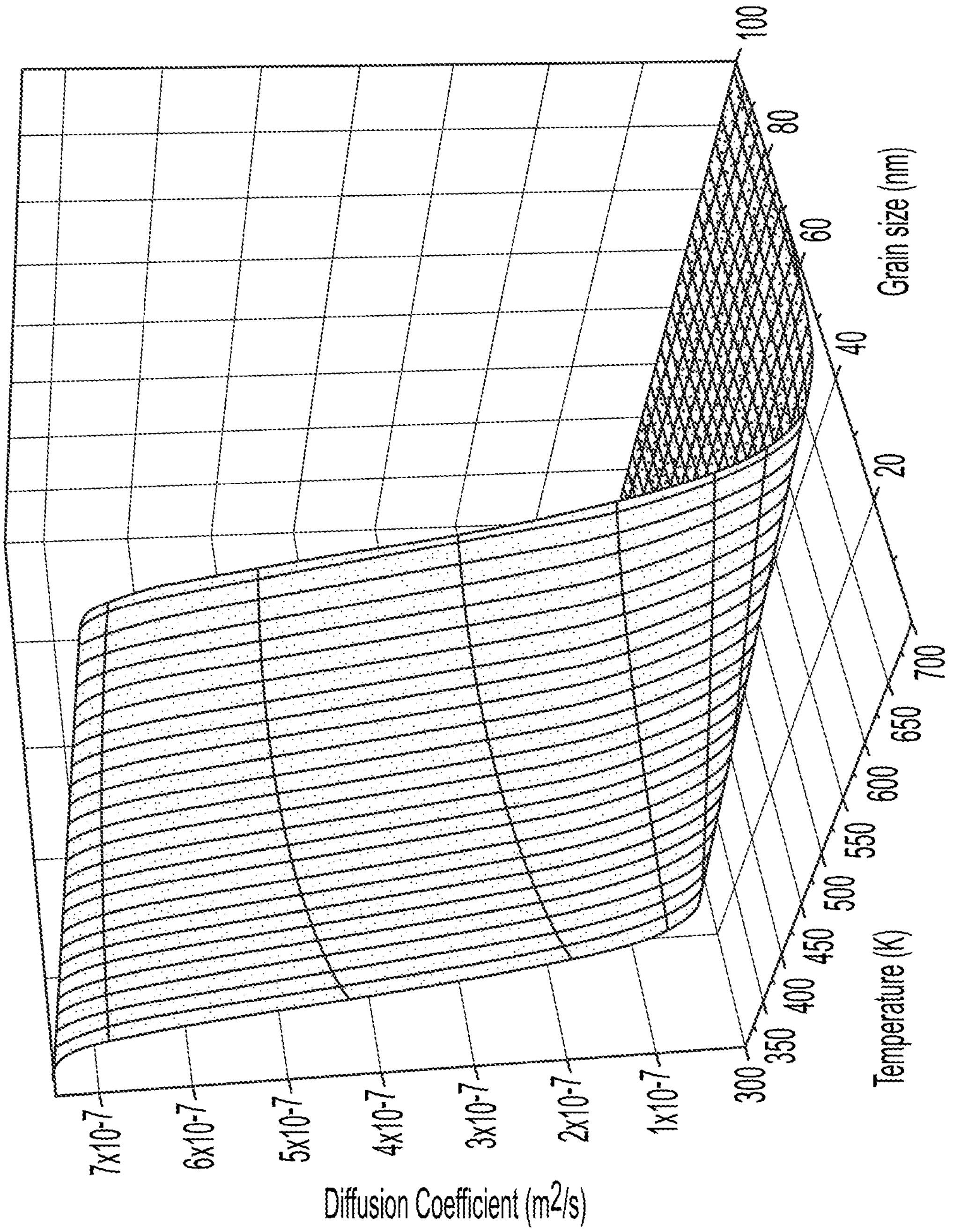
FIG. 4 is a diagram illustrating the theoretical relationship between grain size, temperature, and nitrogen diffusion coefficient for example alloy compositions including iron nitride.

FIG. 4 is a chart illustrating the theoretical relationship between grain size, temperature, and nitrogen diffusion coefficient for example alloy compositions including iron nitride. The chart was plotted based on a mathematical model based on the Arrhenius diffusion coefficient equation and the grain size effect. As grain size reduces from 100 nm to 20 nm and lower, the nitrogen diffusion coefficient increases from about 0 to about $7\times10^{-7}$ $m^2/s$. For a selected grain size, for example, 40 nm, the nitrogen diffusion coefficient increases with temperature.

Example 2

Figure 5:
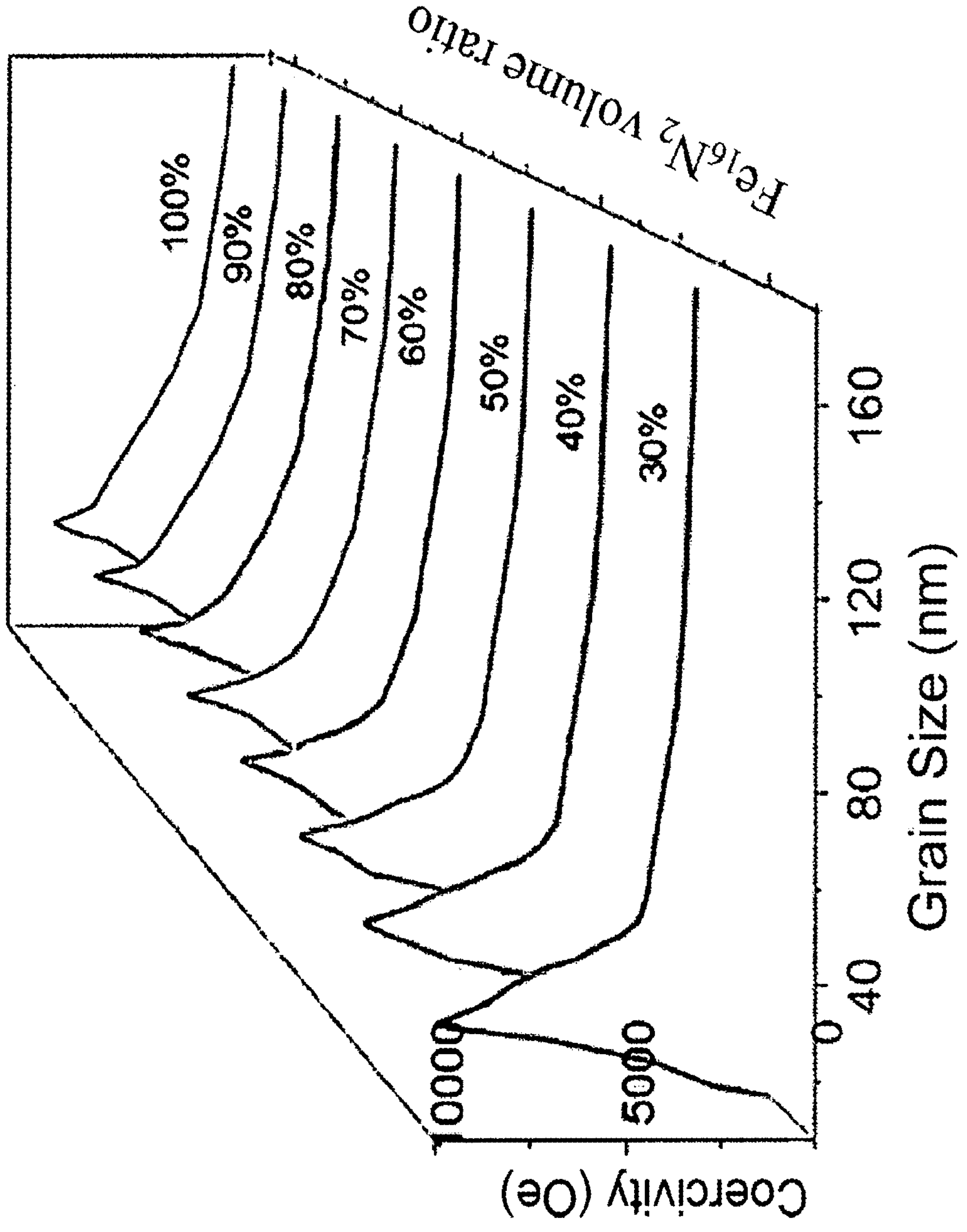
FIG. 5 is a diagram illustrating the theoretical relationship between coercivity and average grain size for different volume ratios of $Fe_{16}N_2$.
Figure 6:
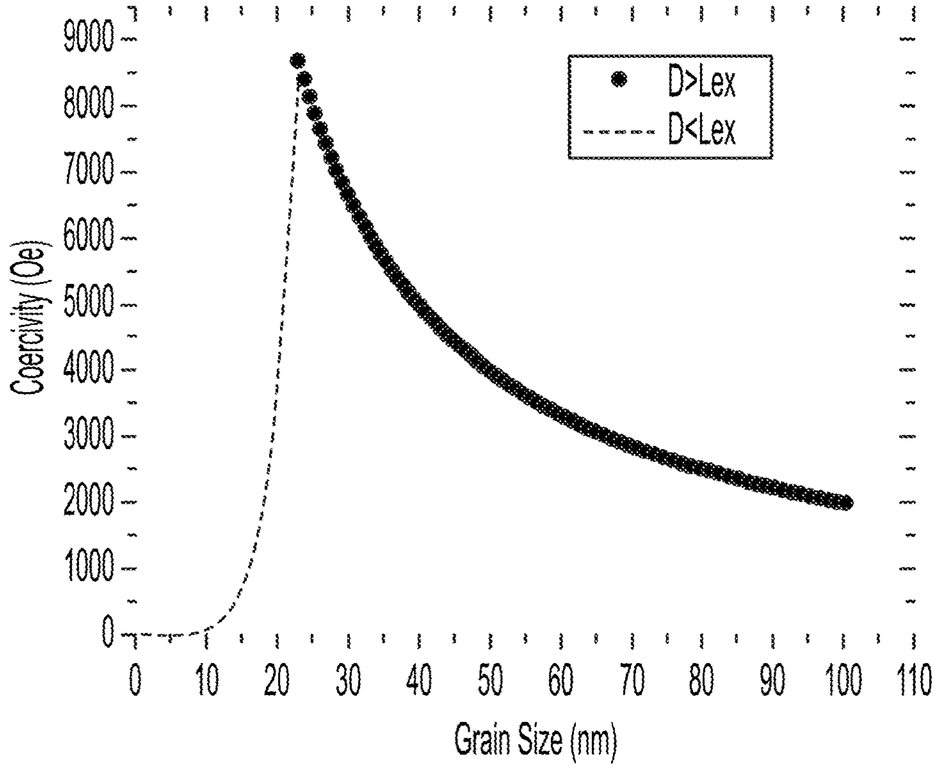
FIG. 6 is a diagram illustrating the theoretical relationship between coercivity and average grain size for a predetermined volume ratio of $Fe_{16}N_2$.

The relationship between average grain size and coercivity of iron nitride grains was evaluated. A random anisotropy model for $Fe_{16}N_2$ was set up, and the relationship between average grain size and coercivity was established using the model. For relatively small grain sizes, for example, grain sizes smaller than the ferromagnetic exchange length $L_{ex}$=23 nm for iron nitride, the coercivity was of the order of $D^6$, where D is the average grain size. For relatively larger grain sizes, for example, grain sizes larger than the ferromagnetic exchange length, the coercivity was of the order of $D^{-1}$. FIG. 5 is a diagram illustrating the theoretical relationship between coercivity and average grain size for different volume ratios of $Fe_{16}N_2$ based on the model. FIG. 6 is a diagram illustrating the theoretical relationship between coercivity and average grain size for a fixed volume ratio of $Fe_{16}N_2$. As seen in FIGS. 5 and 6, as the average grain size reduced to approach $L_{ex}$, the coercivity increased to a peak. As the average grain size reduced to sizes lower than $L_{ex}$, the coercivity reduced from the peak, relatively sharply.

Figure 7:
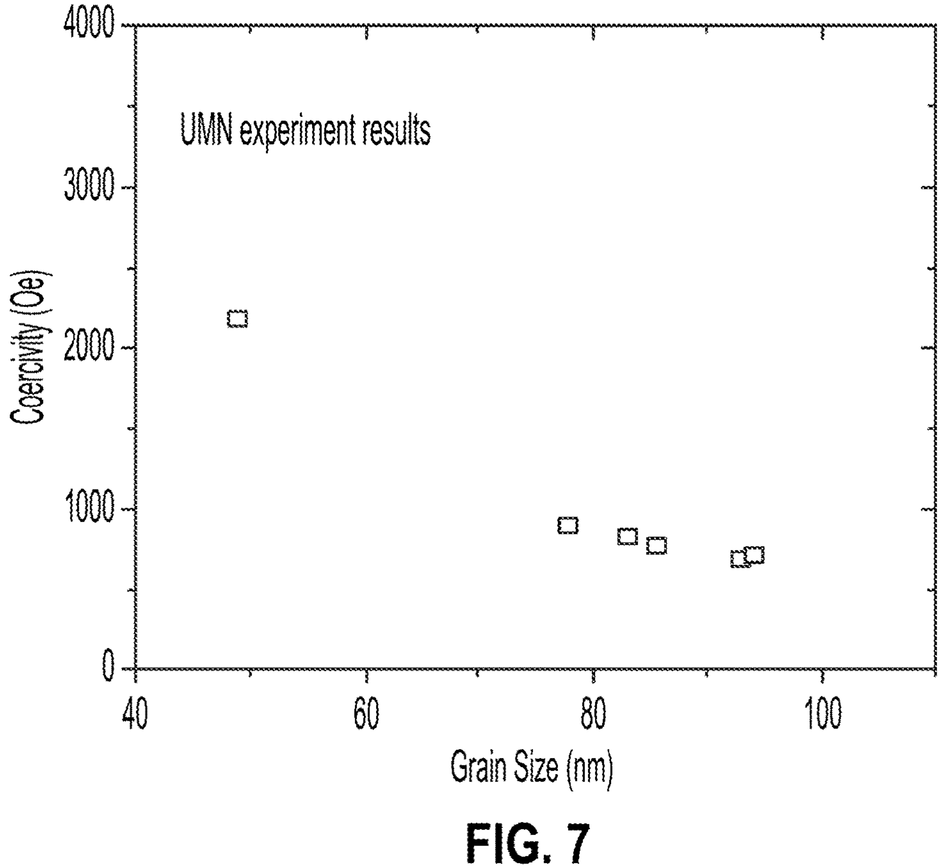
FIG. 7 is a diagram illustrating an example observed relationship between coercivity and average grain size for a predetermined volume ratio of $Fe_{16}N_2$.

FIG. 7 is a diagram illustrating the observed relationship between coercivity and average grain size for a predetermined volume ratio of $Fe_{16}N_2$. Different sample alloy compositions having average grain sizes between about 50 nm and about 95 nm were prepared by a multi-step integrated method, including 1) to prepare an iron alloy ingot with iron, copper, boron and manganese and other doping elements, 2) to prepare the iron alloy ribbons (foils) using a melt-spinning system, 3) to quench the ribbons, 4) to post-anneal the ribbons, 5) to nitriding the ribbons using NH3 and H2 mixture gases, 6) to quench iron nitride ribbons again, 7) to post-anneal the ribbons with stress or magnetic field or both. The coercivity for each sample alloy composition was measured by a vibrating sample magnetometer (VSM). As seen in FIG. 7, the measured relationship between the coercivity and average grain size conformed to the theoretical prediction, with coercivity increasing as the average grain size reduced to approach $L_{ex}$.

Example 3

Figure 8:
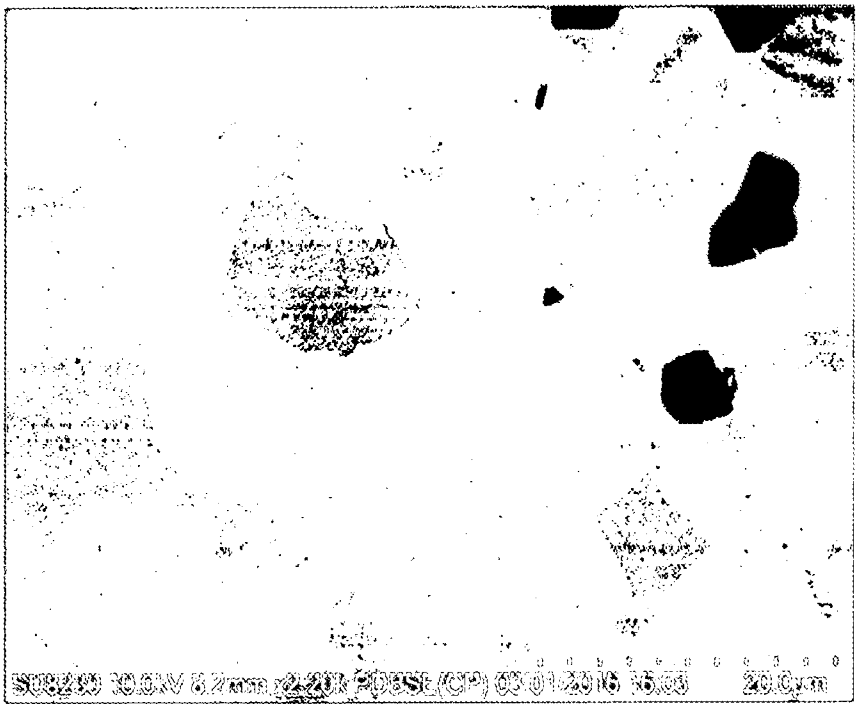
FIG. 8 is a photograph illustrating the microstructure of an example alloy composition including an iron nitride foil, with an average grain size of 8±1.5 μm.

FIG. 8 is a photograph illustrating the microstructure of an example alloy composition including an iron nitride foil, with an average grain size of 8±1.5 μm. The example alloy composition of FIG. 8 was prepared using melt spinning. The composition had a coercivity of 200 Oe. The grains were relatively large, and ferromagnetically coupled.

Example 4

Figure 9:
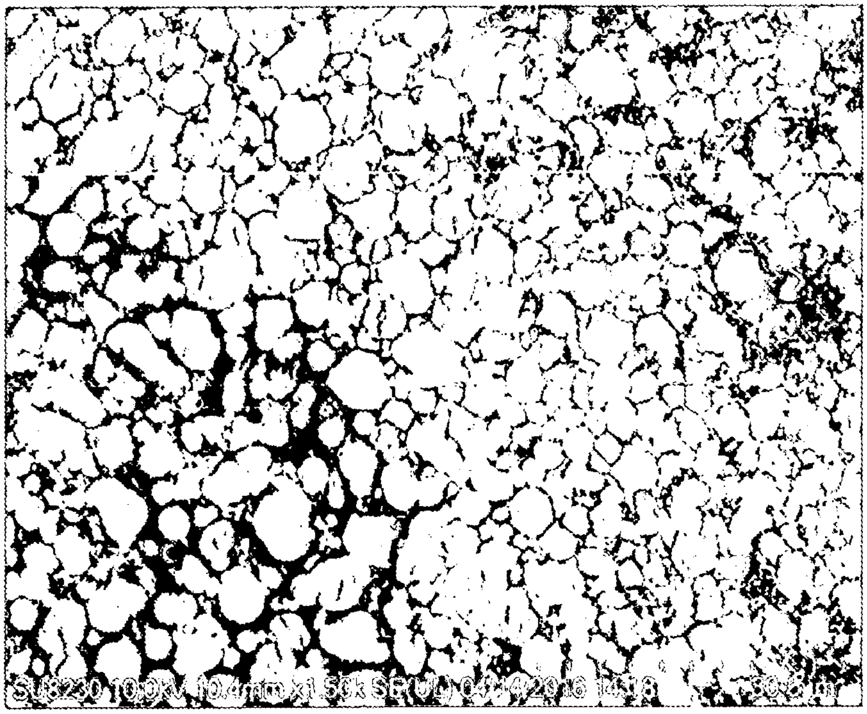
FIG. 9 is a photograph illustrating the microstructure of an example alloy composition including an iron nitride foil, with an average grain size of 6±1.3 μm.

FIG. 9 is a photograph illustrating the microstructure of an example alloy composition including an iron nitride foil, with an average grain size of 6±1.3 μm. The example alloy composition of FIG. 9 was prepared using melt spinning. The composition had a coercivity of 2037 Oe. The grain boundaries were thicker compared to the grains of the example alloy composition of Example 3, and the ferromagnetic grains were separated by non-magnetic material.

Example 5

Figure 10:
FIG. 10 is a photograph illustrating the microstructure of an example alloy composition including an iron nitride foil, with an average grain size of 220±60 nm.
Figure 11:
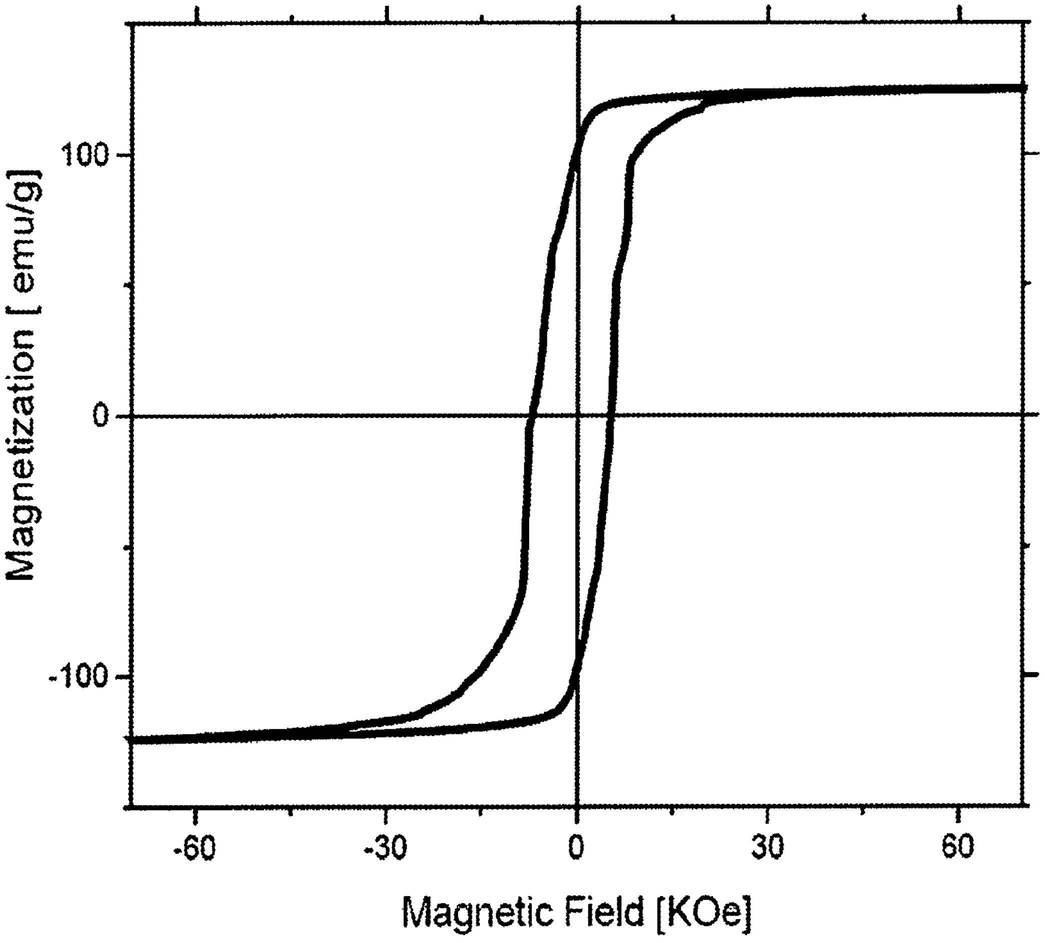
FIG. 11 is a diagram illustrating a hysteresis loop of magnetization versus applied magnetic field for a permanent magnet formed from the example alloy composition of FIG. 10.

FIG. 10 is a photograph illustrating the microstructure of an example alloy composition including an iron nitride foil, with an average grain size of 220±60 nm. The example alloy composition of FIG. 10 was prepared using melt spinning. The composition had a relatively high coercivity of 6220 Oe, for example, compared to the example alloy compositions of Examples 3 and 4. The grain boundaries were non-magnetic, and the ferromagnetic grains were separated by non-magnetic material. FIG. 11 is a diagram illustrating a hysteresis loop of magnetization versus applied magnetic field for a permanent magnet formed from the example alloy composition of FIG. 10.

Example 6

A sample alloy composition including a plurality of grains with a predetermined average grain size may be prepared according to the present prophetic example. Pure iron foil, for example, having a thickness of between about 1 μm to about 1 cm, is used as a precursor. The iron foil is heated at a temperature between about 650° C. and about 1600° C. for a period of time between about 0.5 hours and about 10 hours, followed by quenching in a liquid medium. The liquid medium includes cold water, brine, oil, liquid nitrogen, or liquid $CO_2$. A grain structure associated with an average grain size between about 20 nm and about 100 nm is formed. The sample is nitrided using ammonia, at a temperature between about 120° C. and about 500° C. subject to a pressure between about 1 atmosphere and about 100 atmospheres. The nitride sample is annealed by a strained workpiece technique.

Example 7

A composition including iron foil, 2 wt. % Boron, 3 wt. % copper, and 25 wt % urea was annealed by heating at 700° C. for 0.5 hours and about 10 hours, followed by quenching at room temperature in cold water. The composition was then annealed in a urea environment at 160° C., followed by a second quenching to promote phase transformation from $Fe_{3-4}N$ to $Fe_8N$. Finally, the composition was stress annealed at 160° C. for periodic intervals of 5 hours.

Example 8

Figure 12:
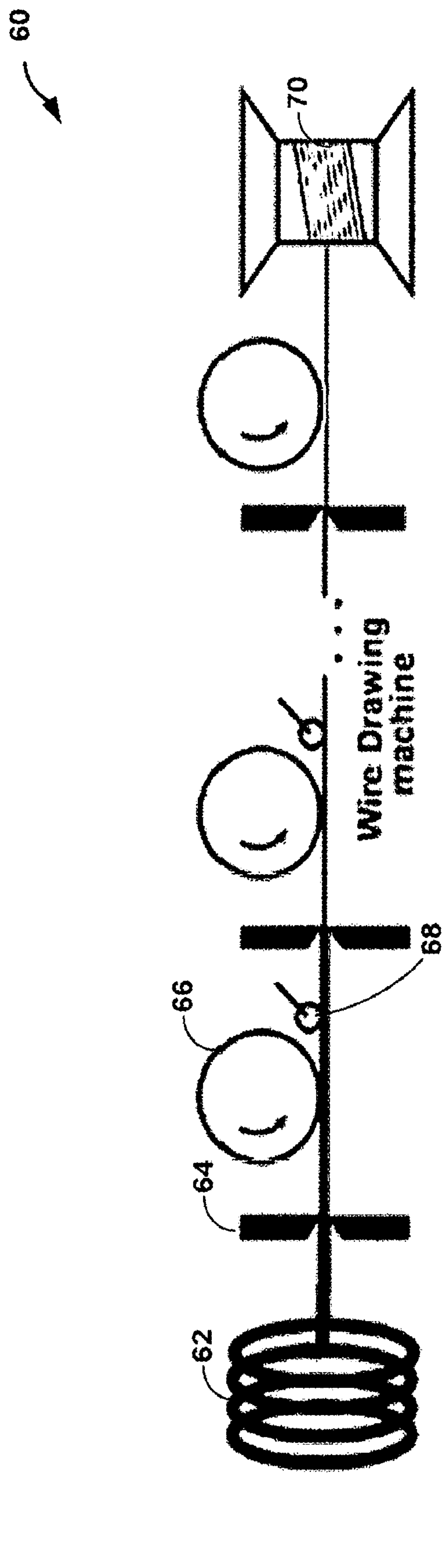
FIG. 12 is a diagram illustrating an example workpiece drawing apparatus fixture including five workpiece drawing stage dies.

The drawing of a workpiece through multi-stage dies was evaluated. FIG. 12 is a diagram illustrating an example workpiece drawing apparatus fixture including five work-piece drawing stage dies. As shown, apparatus 60 includes a source workpiece 62 drawn through a first stage including a die 64, a roller 66 and a tensioner 68. Apparatus 60 includes four more similar stages 32 for successively drawing workpiece 62 into progressively narrower diameters, finally resulting in workpiece 70. The dimensions of the workpiece and dies at different stages are summarized in TABLE 1. The parameters d1 to d6 represent different possible wire size reduction combinations.

TABLE 1

| | Stage 1 | Stage 2 | Stage 3 | Stage 4 | Stage 5 |
|---|---|---|---|---|---|
| d1 (mm) | 1 | 0.8 | 0.5 | 0.2 | 0.1 |
| d2 (mm) | 12 | 10 | 8 | 5 | 3 |
| d3 (mm) | 60 | 50 | 45 | 35 | 30 |
| d4 (mm) | 5 | 4 | 3.5 | 3 | 2 |
| d5 (mm) | 20 | 16 | 14 | 12 | 8 |
| d6 (mm) | 30 | 28 | 25 | 21 | 21 |

Example 9

Figure 13:
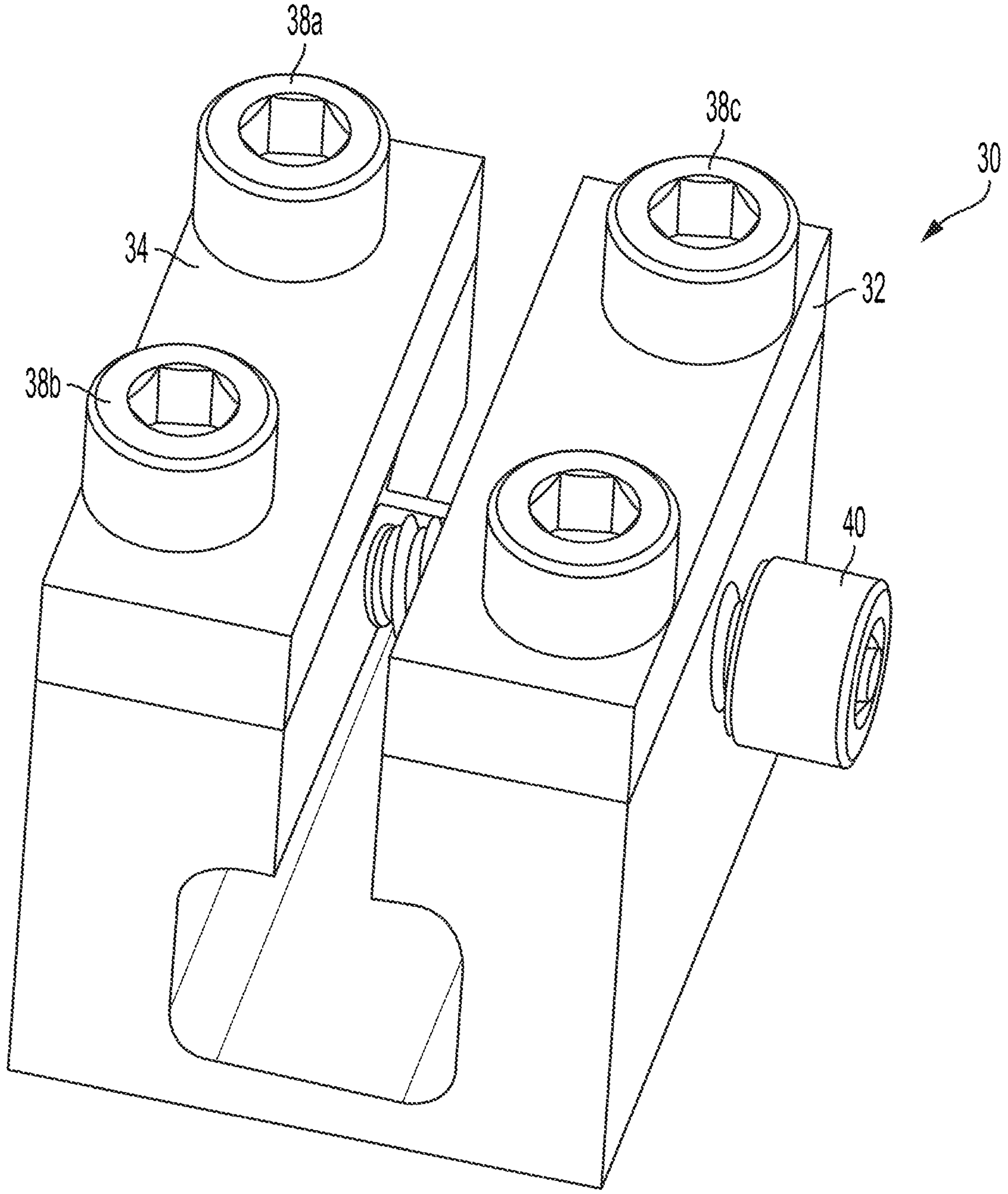
FIG. 13 is a diagram illustrating an example tensile stretching fixture for applying tensile strain on an example material.

The effect of exerting tensile strain on a sample composition was evaluated. FIG. 13 is a conceptual diagram illustrating an example tensile stretching fixture 30 for applying tensile strain on an example material. As shown, fixture 30 includes clamps 32 and 34 which may secure opposing ends of iron-based workpiece 36 by tightening screws 38*a-d*. Once iron-based workpiece 36 is secured in fixture 30, bolt 40 may be turned to rotate the threaded body of bolt 40 to increase the distance between clamps 32 and 34 and exert a tensile force on iron workpiece 36. The value of the elongation or stress generated by the rotation of bolt 40 may be measured by any suitable gauge, such as, e.g., a strain gauge. In some examples, fixture 30 may be placed in a furnace (e.g., a tube furnace) or other heated environment so that iron-based workpiece 36 may be heated or annealed during and/or after iron-based workpiece 28 is stretched by fixture 30.

Figure 14:
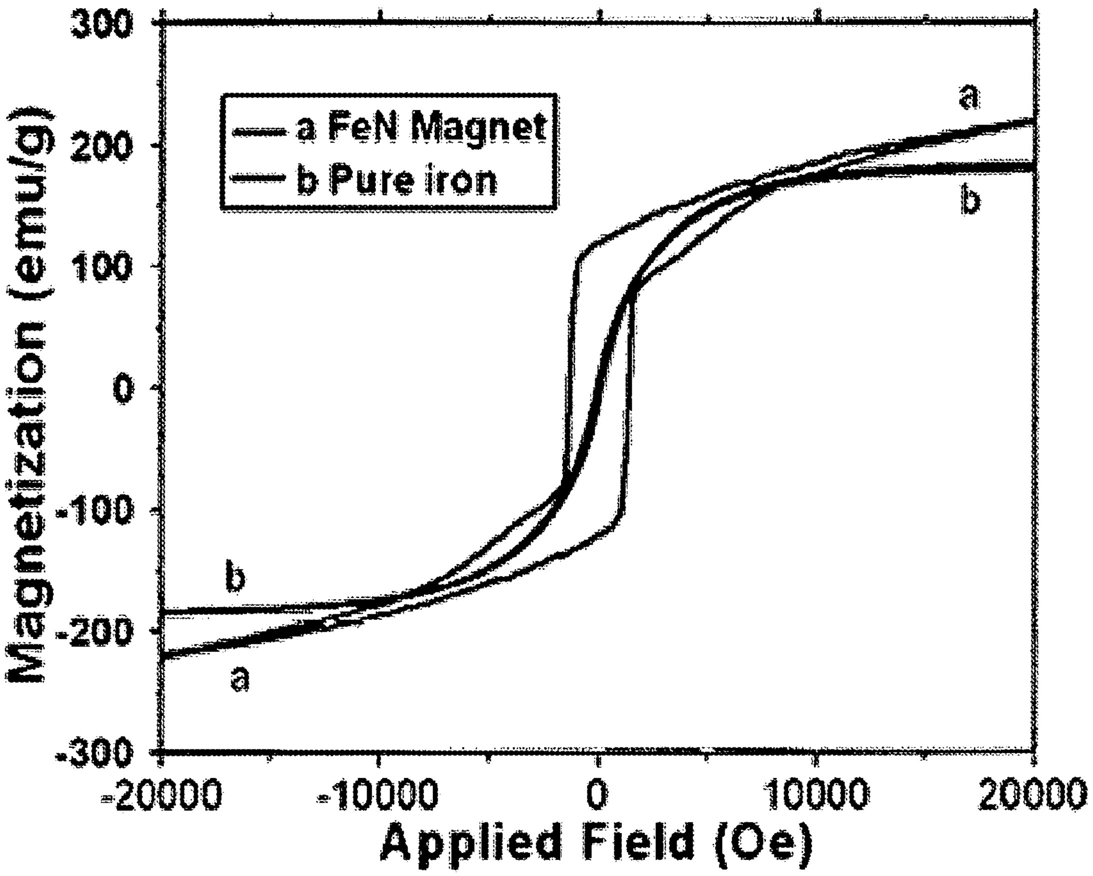
FIG. 14 is a diagram illustrating a hysteresis loop of magnetization versus applied magnetic field for a magnetic material prepared by applying tensile strain using the example tensile stretching fixture of FIG. 13.

FIG. 14 is a diagram illustrating a hysteresis loop of magnetization versus applied magnetic field for a magnetic material prepared by applying tensile strain on iron-based workpiece 36 using the example tensile stretching fixture of FIG. 13. Iron-based workpiece 36 included a composition including iron, copper, boron, nitrogen, and oxygen, and was subjected to a tensile stress of up to 800 MPa.

Example 10

Figure 15:
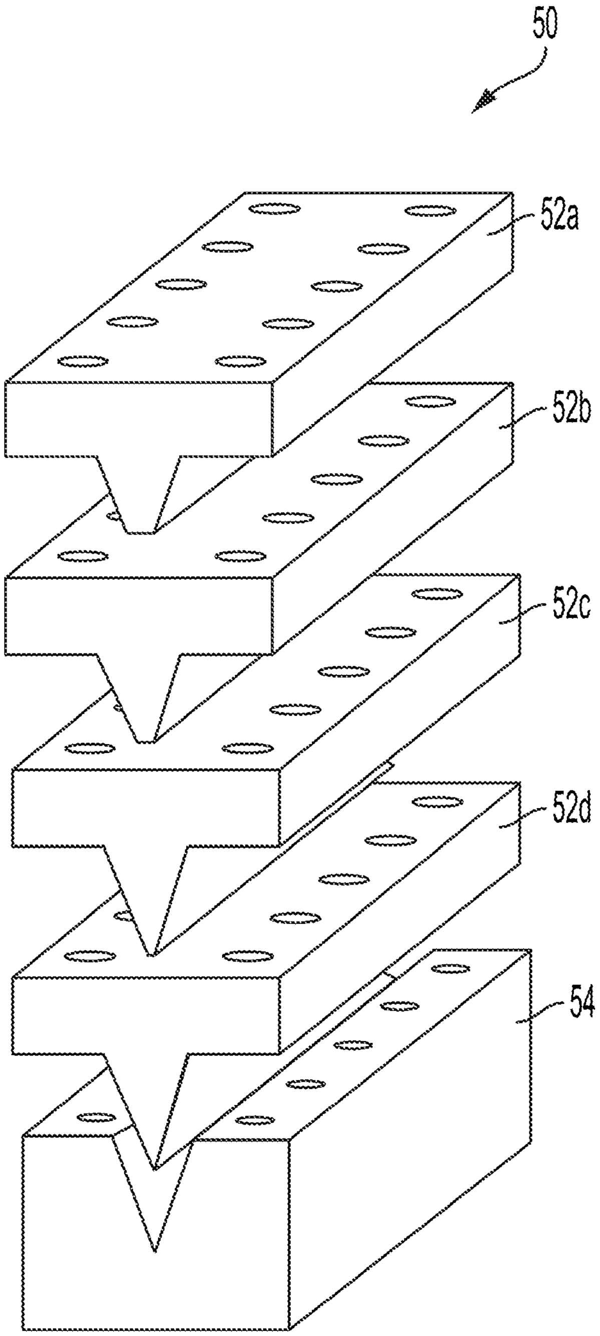
FIG. 15 is a diagram illustrating an example compression fixture for applying compressive strain on an example material.

The effect of exerting compression on a sample composition was evaluated. FIG. 15 is a conceptual diagram illustrating an example compression fixture 50 for applying compressive strain on an example material. As shown, fixture 50 includes loads 52*a*-52*d* and a base 54 onto which loads 52*a-d* may be placed. Loads 52*a-d* may be used to apply a compressive strain on an iron-based workpiece placed in base 54. The value of the elongation or stress generated may be measured by any suitable gauge, such as, e.g., a strain gauge. In some examples, fixture 50 may be placed in a furnace (e.g., a tube furnace) or other heated environment so that the iron-based workpiece may be heated or annealed during and/or after the iron-based workpiece is compressed by fixture 50.

Figure 16:
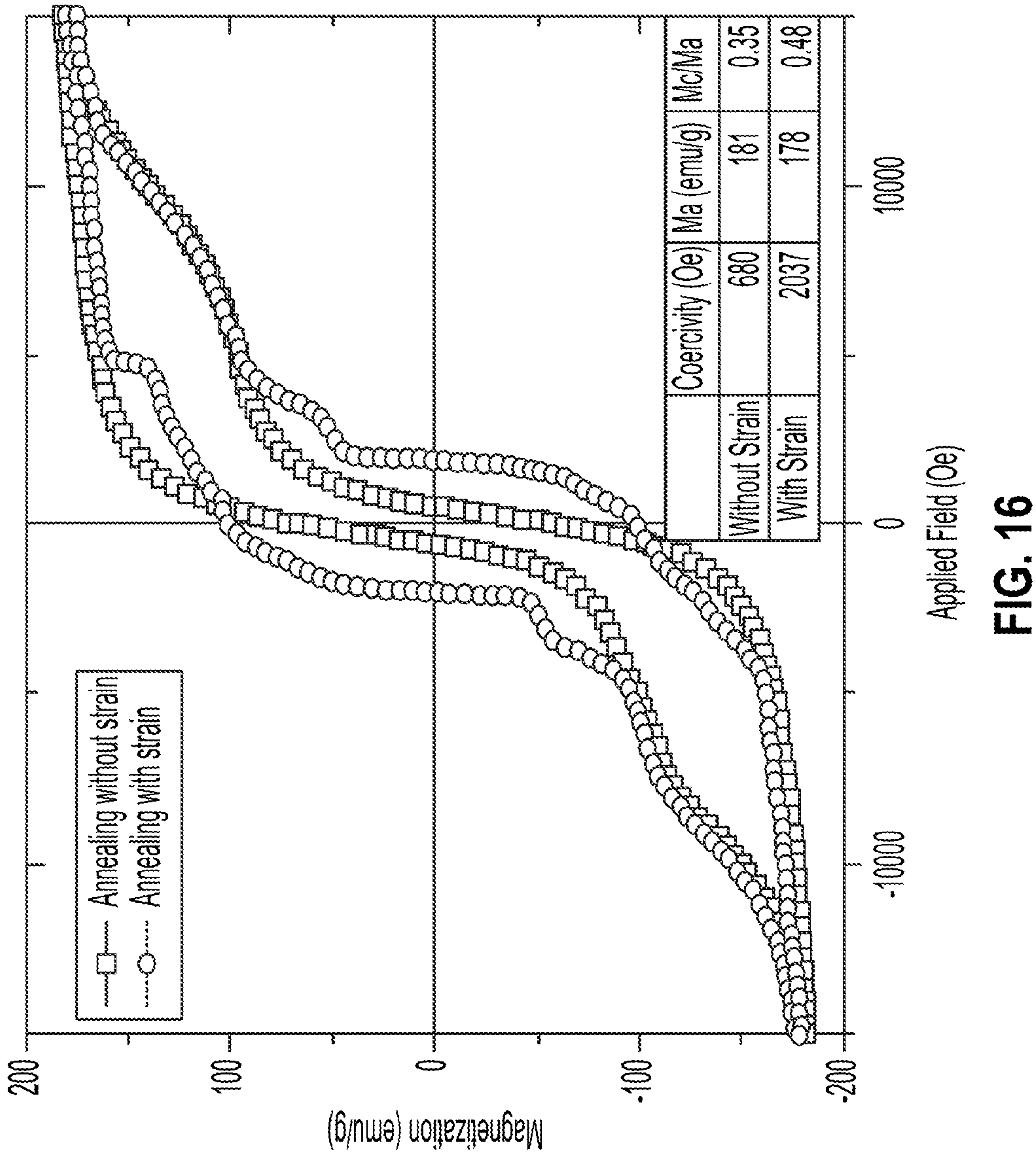
FIG. 16 is a diagram illustrating a hysteresis loop of magnetization versus applied magnetic field for a magnetic material prepared by applying compressive strain using the example compression fixture of FIG. 15.

FIG. 16 is a diagram illustrating a hysteresis loop of magnetization versus applied magnetic field for a magnetic material prepared by applying compressive strain on an iron-based workpiece using the example tensile stretching fixture of FIG. 15. The iron-based workpiece included a composition including iron, copper, boron, nitrogen, and oxygen, and was subjected to a tensile stress of greater than 800 MPa during annealing at 160° C. to 200° C. FIG. 16 also illustrates a hysteresis loop for the same composition, that was not subjected to the compressive strain. As seen in FIG. 16, the coercivity for the unstrained sample was 660 Oe, which increased to 2037 Oe for the strained sample.

Example 11

Figure 17:
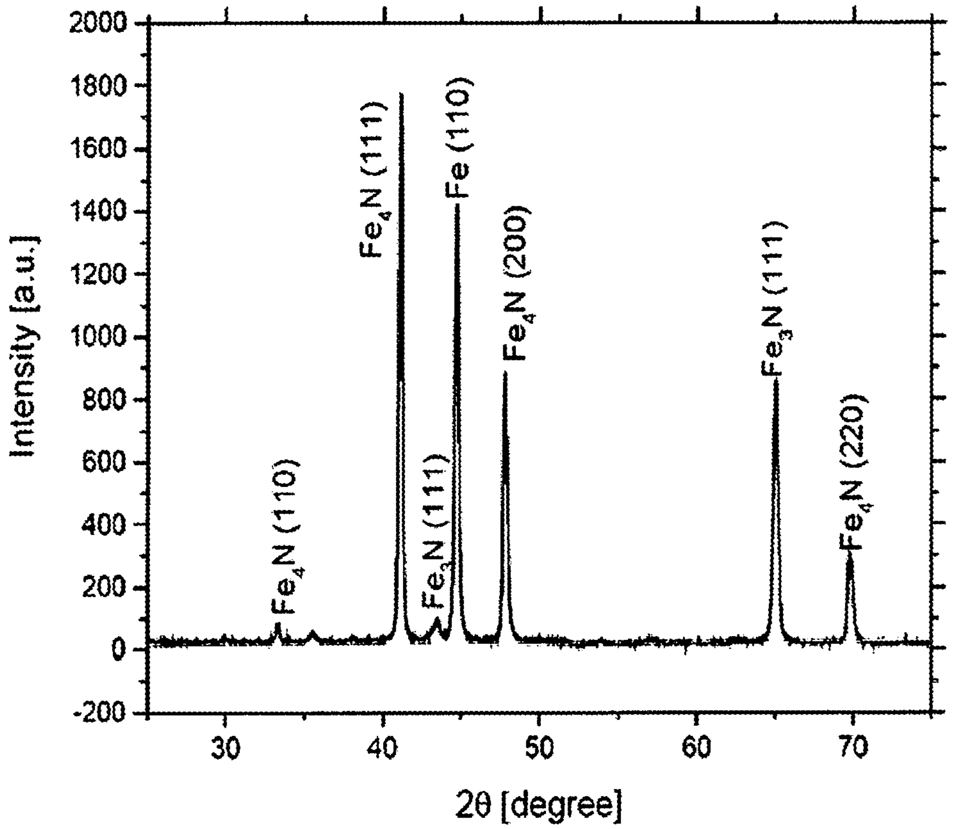
FIG. 17 is a diagram illustrating an X-ray diffraction (XRD) spectrum of example thin iron foils nitrided using ammonia in a tube furnace.

Nitriding of an iron-based material using ammonia was evaluated. FIG. 17 is a diagram illustrating an X-ray diffraction (XRD) spectrum of example thin iron foils nitrided using ammonia in a tube furnace. Thin foils of 50-100 μm were nitride using a mixture of $NH_3/H_2$ at 400-700° C. About 9-11% nitrogen composition was found in foils after the nitriding.

Example 12

Figure 18A:
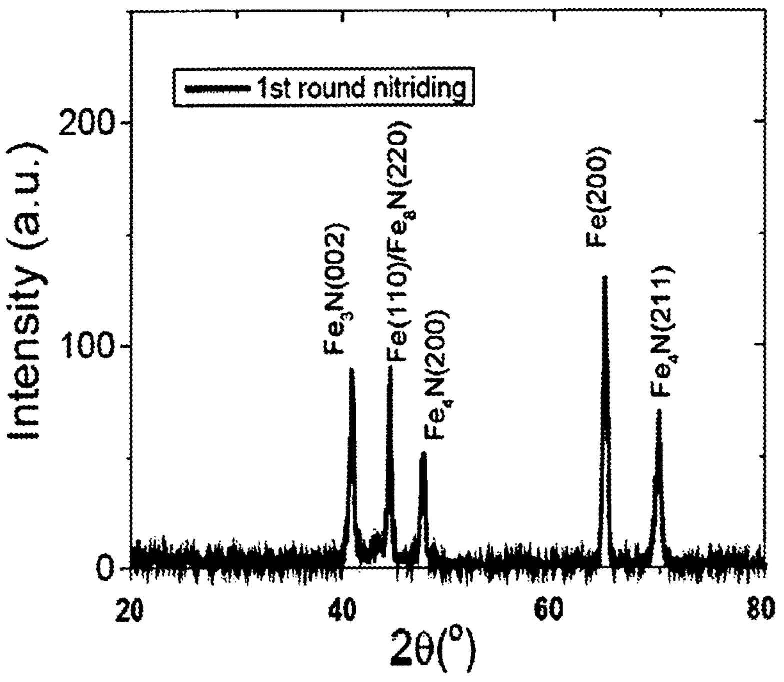
FIGS. 18A and 18B are diagrams illustrating XRD spectra of example thin iron foils nitrided using jar nitriding, after a first round of nitriding and a second round of nitriding, respectively.
Figure 18B:
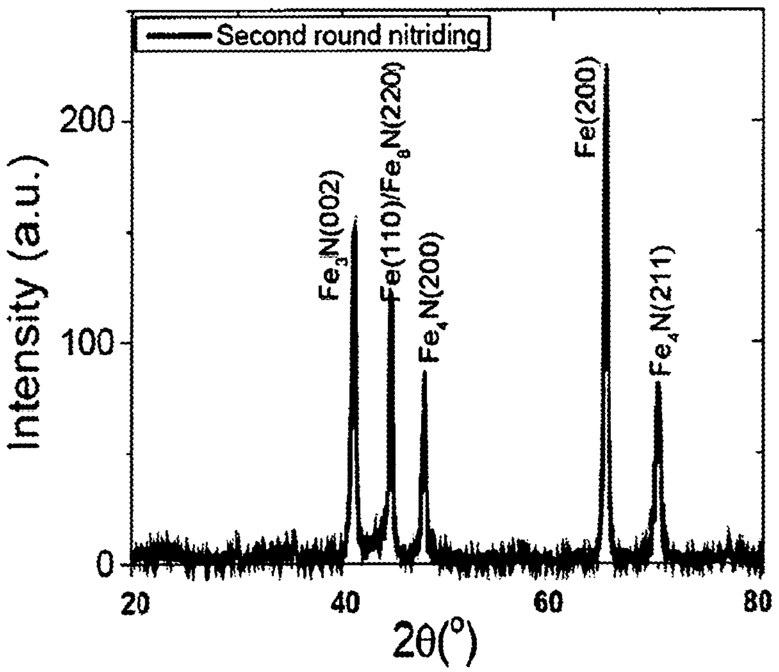

Nitriding of an iron-based material using jar nitriding was evaluated. FIGS. 18A and 18B are diagrams illustrating XRD spectra of example thin iron foils nitrided using jar nitriding, after a first round of nitriding and a second round of nitriding, respectively. The development of $Fe_3N$ and $F_4N$ phases was observed. The jar nitriding was performed at 150° C. to 450° C. in an atmosphere generated by using urea, ammonia, or another nitrogen source in the jar.

Example 13

Figure 19A:
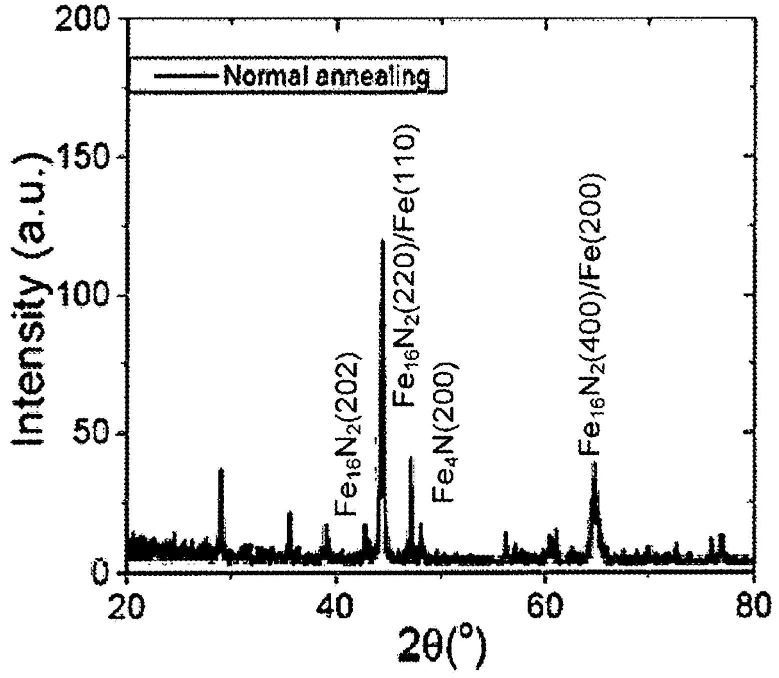
FIGS. 19A and 19B are diagrams illustrating XRD spectra of example iron nitride compositions with normal annealing and with stress annealing, respectively.
Figure 19B:
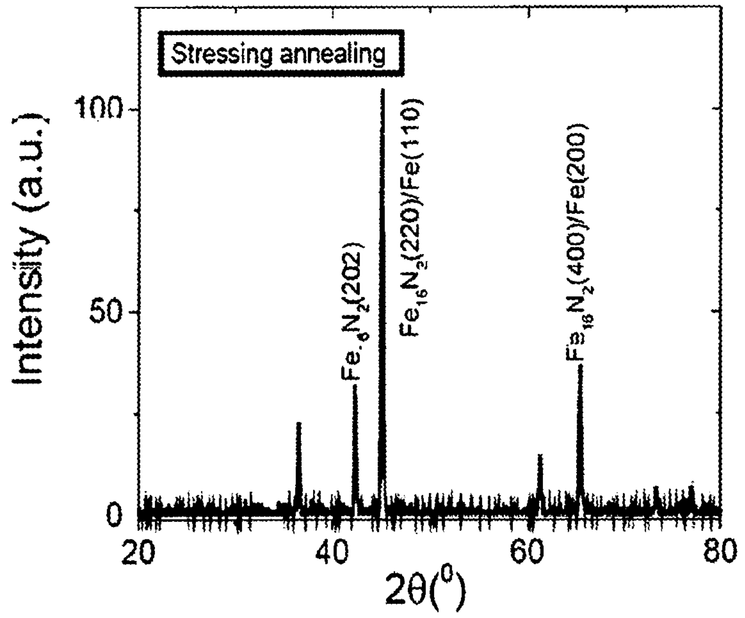

The effect of normal annealing and stress annealing on nitriding an iron-based material was evaluated. FIGS. 19A and 19B are diagrams illustrating XRD spectra of example iron nitride compositions with normal annealing and with stress annealing, respectively. The intensity of $Fe_{16}N_2$ phase was observed to enhance by strained workpiece annealing. The workpiece was subject to tensile stresses of up to 800 MPa at temperatures of 160° C. to 200° C.

Example 14

Figure 20:
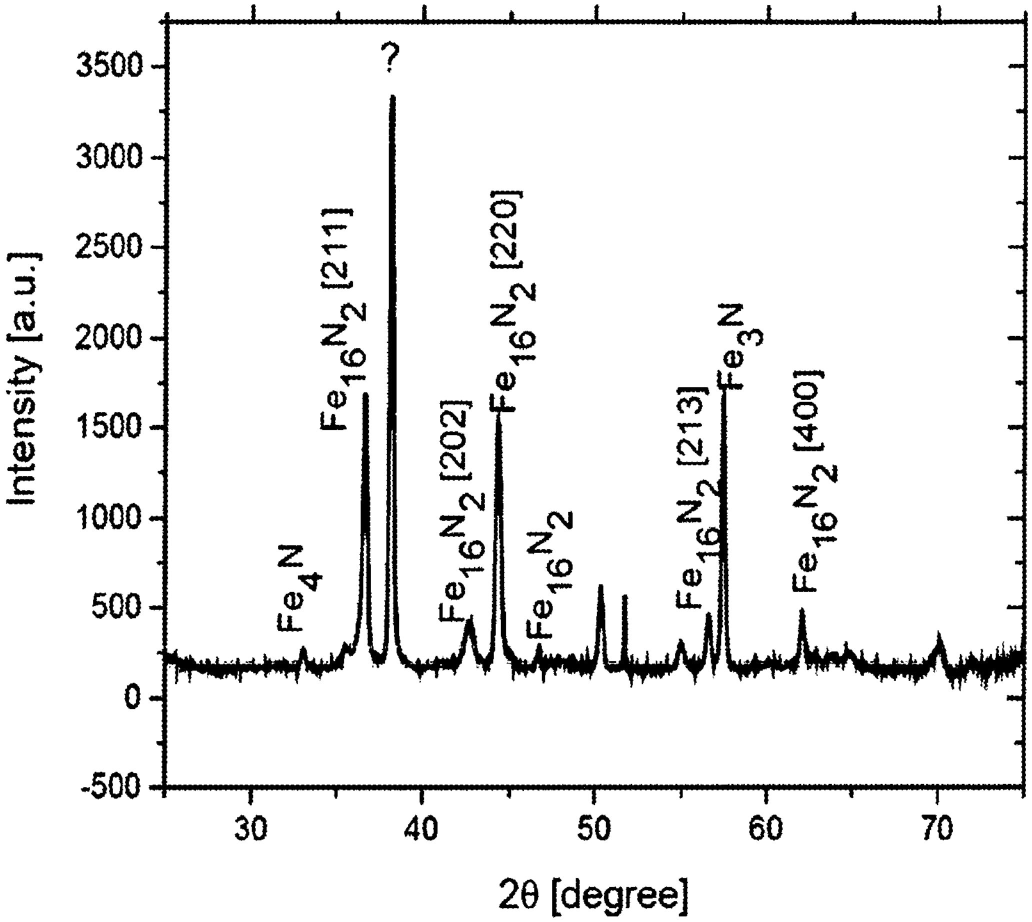
FIG. 20 is a diagram illustrating an XRD spectrum of an example iron nitride composition prepared by strained workpiece method by applying tensile stress during annealing.

The effect of stress annealing on nitriding an iron-based material was evaluated. FIG. 20 is a diagram illustrating an XRD spectrum of an example iron nitride composition prepared by strained workpiece method by applying tensile stress during annealing. The intensity of $Fe_{16}N_2$ phase was observed to enhance by strained workpiece annealing. The workpiece was subject to tensile forces stresses of up to 800 MPa at temperatures of 160° C. to 200° C.

Example 15

Figure 21A:
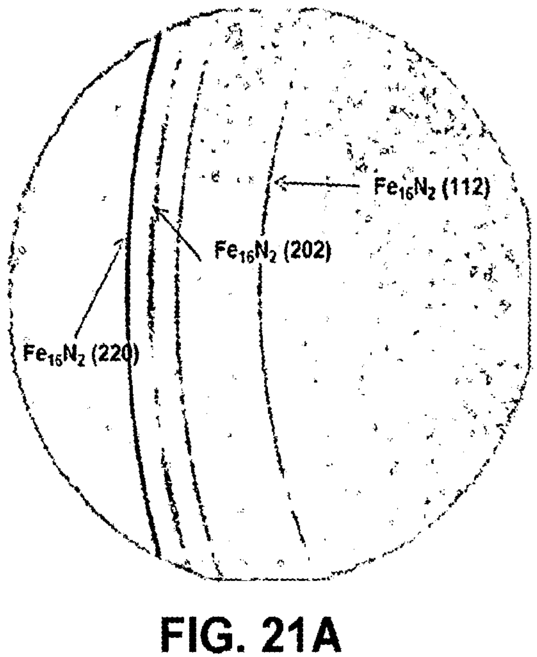
FIGS. 21A and 21B are diagrams illustrating XRD patterns of example iron nitride compositions with normal annealing and with stress annealing, respectively.
Figure 21B:
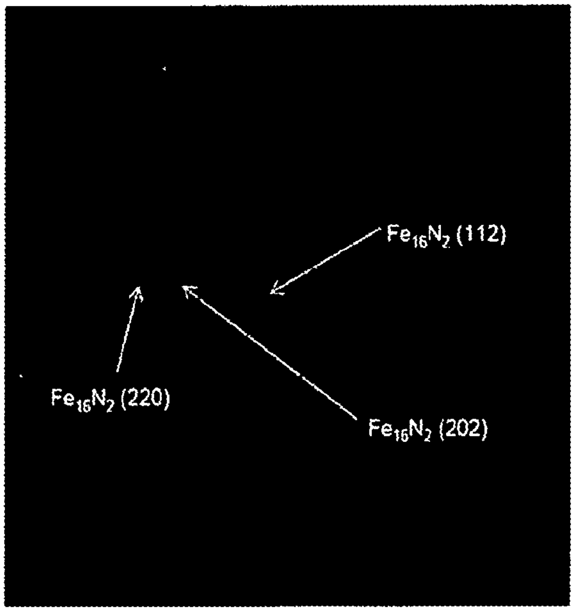

The effect of normal annealing and stress annealing on the crystal structure of nitride iron-based material was evaluated. FIGS. 21A and 21B are diagrams illustrating XRD patterns of example iron nitride compositions with normal annealing and with stress annealing, respectively. The sample with stress annealing had built up a textured structure which helps in obtaining more directional nature of the crystal, as seen in FIG. 21B. The directional structure helps in obtaining high $M_r$ (remanence)/$M_s$ (saturation magnetization) ratio and high coercivity.

Various examples have been described. These and other examples are within the scope of the following claims.

The invention claimed is:

1. An alloy composition comprising:

a plurality of grains comprising an iron nitride phase, wherein the alloy composition has a coercivity of at least about 2000 Oe, wherein the average grain size is less than about 50 nm, and wherein an average grain boundary size of the plurality of grains is between about 2 nm and about 5 nm, and comprising a nonmagnetic element or compound configured to form domain wall pinning sites at the grain boundaries, wherein the nonmagnetic element or compound is selected from Cu, Zr, Ta, Ni, Ru, $SiO_2$, $Al_2O_3$, or combinations thereof.

2. The alloy composition of claim 1, wherein the iron nitride phase comprises α"-$Fe_{16}N_2$.

3. The alloy composition of claim 2, comprising greater than about 50% by volume of the α"-$Fe_{16}N_2$ phase.

4. The alloy composition of claim 1, wherein a majority of the plurality of grains have respective easy axes of magnetizing aligned in substantially the same direction.

5. A bulk permanent magnetic material comprising the alloy composition of claim 1.

* * * * *